(12) United States Patent
Nomura et al.

(10) Patent No.: US 12,547,517 B2
(45) Date of Patent: Feb. 10, 2026

(54) ARRANGEMENT PLAN SEARCH DEVICE, COMPUTER SYSTEM, AND ARRANGEMENT PLAN SEARCH METHOD

(71) Applicant: Hitachi, Ltd., Tokyo (JP)

(72) Inventors: Shimpei Nomura, Tokyo (JP); Mitsuo Hayasaka, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 741 days.

(21) Appl. No.: 17/941,210

(22) Filed: Sep. 9, 2022

(65) Prior Publication Data

US 2023/0297486 A1 Sep. 21, 2023

(30) Foreign Application Priority Data

Mar. 16, 2022 (JP) .................. 2022-041062

(51) Int. Cl.
*G06F 9/44* (2018.01)
*G06F 9/50* (2006.01)
*G06F 11/34* (2006.01)
*H04L 67/51* (2022.01)

(52) U.S. Cl.
CPC ........ *G06F 11/3409* (2013.01); *G06F 9/5044* (2013.01); *H04L 67/51* (2022.05); *G06F 2209/501* (2013.01)

(58) Field of Classification Search
CPC ................................................. G06F 11/3409
USPC .......................................................... 718/106
See application file for complete search history.

(56) References Cited

U.S. PATENT DOCUMENTS 9,411,622 B2     8/2016  Zhu et al.
2014/0380307 A1  12/2014 Zhu et al.
2022/0398189 A1* 12/2022 Jansen .................. G06F 9/5011

* cited by examiner

*Primary Examiner* — Timothy A Mudrick
(74) *Attorney, Agent, or Firm* — MATTINGLY & MALUR, PC

(57) ABSTRACT

In an application platform, an application performance model and a data store performance model in each of a plurality of site systems are stored, and a processor receives target performance information, determines an application allocated resource amount for the plurality of site systems based on the application performance model, determines required performance of a data store for the plurality of site systems, determines a data store allocated resource amount for the plurality of site systems based on the data store performance model, and searches for an arrangement plan of the application and the data store capable of implementing the application allocated resource amount and the data store allocated resource amount in the plurality of site systems.

13 Claims, 23 Drawing Sheets

FIG. 3

METADATA DB 300 (SITE 1)

| DATA STORE ID 301 | DATA ID 302 | DATE AND TIME 303 | TYPE 304 | PATH 305 | SIZE 306 | REPLICA SOURCE SITE 307 | DOMESTIC MOVEMENT 308 | ABROAD MOVEMENT 309 |
|---|---|---|---|---|---|---|---|---|
| DATA STORE A | AAAA | – | Original | /Dir1/File1 | xx | – | MOVABLE | MOVABLE |
| | AAAA | XXXX/XX/XX XX:XX | Snapshot | /SnapshotX/Dir1/File1 | xx | – | MOVABLE | MOVABLE |
| | BBBB | – | Original | /Dir2/File2 | xx | – | MOVABLE | MOVABLE |
| | CCCC | YYYY/YY/YY YYYY | Replica | /ReplicaY/Dir3/File3 | xx | SITE 2 | MOVABLE | NON-MOVABLE |
| | ... | | | ... | | | | |
| DATA STORE B | XXXX | – | Original | /bucket1/obj1 | xx | – | MOVABLE | NON-MOVABLE |
| | | | | | | | | |

FIG. 4

RESOURCE MANAGEMENT TABLE 400

| SITE ID 401 | COUNTRY 402 | EXECUTION ENVIRONMENT ID 403 | NUMBER OF CORES 404 | MEMORY [GB] 405 | CPU USAGE 406 | MEMORY USAGE 407 | NUMBER OF NODE CORES 408 | NODE MEMORY [GB] 409 | COST [$/NODE] 410 | POWER [kWh/NODE] 411 | DATA TRANSFER COST (In) [$/GB] 412 | DATA TRANSFER COST (Out) [$/GB] 413 |
|---|---|---|---|---|---|---|---|---|---|---|---|---|
| SITE 1 | JP | EXECUTION ENVIRONMENT 1 | xx | xx | xx | xx | xx | xx | xx | xx | xx | xx |
| SITE 2 | JP | EXECUTION ENVIRONMENT 2 | xx | xx | xx | xx | xx | xx | xx | xx | xx | xx |
| ⋮ | | | | | | | | | | | | |

FIG. 5

INTER-SITE NETWORK MANAGEMENT TABLE 500

NETWORK BANDWIDTH MANAGEMENT TABLE 510

| NETWORK BANDWIDTH [MB/s] | | TRANSFER DESTINATION SITE 512 | | |
|---|---|---|---|---|
| | | SITE 1 | SITE 2 | SITE 3 |
| TRANSFER SOURCE SITE 511 | SITE 1 | – | 100 | 200 |
| | SITE 2 | 100 | – | 50 |
| | SITE 3 | 200 | 50 | – |

NETWORK LATENCY MANAGEMENT TABLE 520

| NETWORK LATENCY [ms] | | TRANSFER DESTINATION SITE 522 | | |
|---|---|---|---|---|
| | | SITE 1 | SITE 2 | SITE 3 |
| TRANSFER SOURCE SITE 521 | SITE 1 | – | 20 | 40 |
| | SITE 2 | 20 | – | 10 |
| | SITE 3 | 40 | 10 | – |

FIG. 6

EXECUTION ENVIRONMENT MANAGEMENT TABLE 600

| EXECUTION ENVIRONMENT ID 601 | TYPE 602 | CPU TYPE 603 | CPU FREQUENCY 604 | MEMORY TYPE 605 |
|---|---|---|---|---|
| EXECUTION ENVIRONMENT 1 | CONTAINER | CPUA | xx | DDR4-xx |
| EXECUTION ENVIRONMENT 2 | CONTAINER | CPUB | xx | DDR4-xx |
| | | | | |

FIG. 7

PERFORMANCE MODEL CORRECTION FACTOR MANAGEMENT TABLE 700
(CORRECTION FACTOR OF NUMBER OF CPU CORES)

| CORRECTION FACTOR OF NUMBER OF CPU CORES/MARGIN | | CORRECTION DESTINATION EXECUTION ENVIRONMENT 702 | | | | |
|---|---|---|---|---|---|---|
| | | EXECUTION ENVIRONMENT 1 | EXECUTION ENVIRONMENT 2 | EXECUTION ENVIRONMENT 3 | EXECUTION ENVIRONMENT 4 | EXECUTION ENVIRONMENT 5 |
| CORRECTION SOURCE EXECUTION ENVIRONMENT 701 | EXECUTION ENVIRONMENT 1 | – | 0.8/1.1 | 0.5/1.1 | N/A | N/A |
| | EXECUTION ENVIRONMENT 2 | 1.25/1.1 | – | 0.625/1.1 | N/A | N/A |
| | EXECUTION ENVIRONMENT 3 | 2.0/1.1 | 1.6/1.1 | – | N/A | N/A |
| | EXECUTION ENVIRONMENT 4 | N/A | N/A | N/A | – | 0.8/1.2 |
| | EXECUTION ENVIRONMENT 5 | N/A | N/A | N/A | 1.25/1.2 | – |

FIG. 8

APPLICATION MANAGEMENT TABLE 800

| APPLICATION ID 801 | DESCRIPTION 803 | NON-EXECUTABLE SITE 804 |
|---|---|---|
| APPLICATION A | IMAGE ANALYSIS | - |
| APPLICATION B | SOUND ANALYSIS | - |
| APPLICATION C | NATURAL LANGUAGE PROCESS | SITE 1, SITE 2 |
| ... | | |

FIG. 9

APPLICATION PERFORMANCE MODEL MANAGEMENT TABLE 900

| APPLICATION ID 901 | | EXECUTION ENVIRONMENT 902 | | |
|---|---|---|---|---|
| APPLICATION A | | EXECUTION ENVIRONMENT 1 | | |
| PERFORMANCE INDEX 910 | ALLOCATED RESOURCE 920 | | | |
| | CPU 921 | MEMORY 922 | NIC BANDWIDTH 923 | BLOCK IO 924 |
| THROUGHPUT [MB/s] | $y=f1(x)$ | $y=f3(x)$ | $y=f5(x)$ | $y=f7(x)$ |
| | ALLOCATED DATA STORE PERFORMANCE 930 | | | |
| | DATA STORE TYPE 931 | IO OPERATION 932 | | PERFORMANCE MODEL 934 |
| | FILE | Sequential Read [MB/s] | | $y=g1(x)$ |
| | | Sequentia Write [MB/s] | | $y=g3(x)$ |
| | ... | | | |

FIG. 10

APPLICATION PERFORMANCE GRAPH 1001

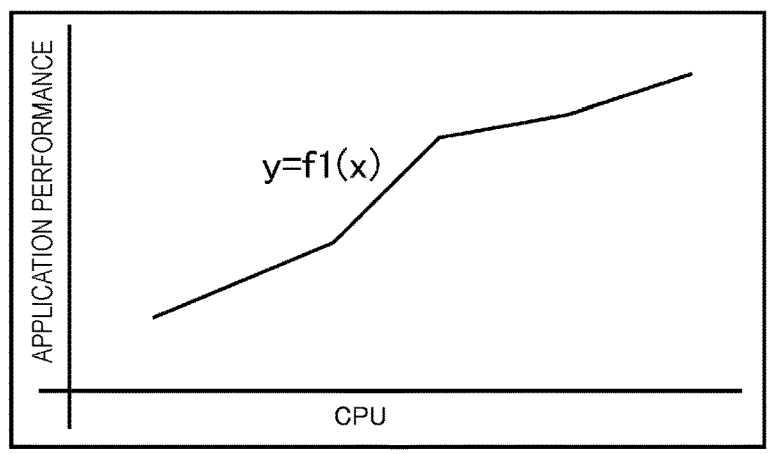

$y=f1(x)$

APPLICATION PERFORMANCE vs CPU

FIG. 11

DATA STORE MANAGEMENT TABLE 1100

| DATA STORE ID 1101 | TYPE 1102 |
|---|---|
| DATA STORE A | File |
| DATA STORE B | Object |
| DATA STORE C | SQL |
| ... | |

FIG. 12

DATA STORE PERFORMANCE MODEL MANAGEMENT TABLE 1200

| DATA STORE ID 1201 | EXECUTION ENVIRONMENT 1202 | | | | |
|---|---|---|---|---|---|
| DATA STORE A | EXECUTION ENVIRONMENT 1 | | | | |
| IO OPERATION 1211 | CPU 1212 | MEMORY 1213 | NIC BANDWIDTH 1214 | BLOCK IO 1215 | |
| Sequential Read [MB/s] | $y=h1(x)$ | $y=h3(x)$ | $y=h5(x)$ | $y=h7(x)$ | |
| Sequential Write [MB/s] | | | | | |
| Random Read [IOPS] | | | | | |
| ... | | | | | |

FIG. 13

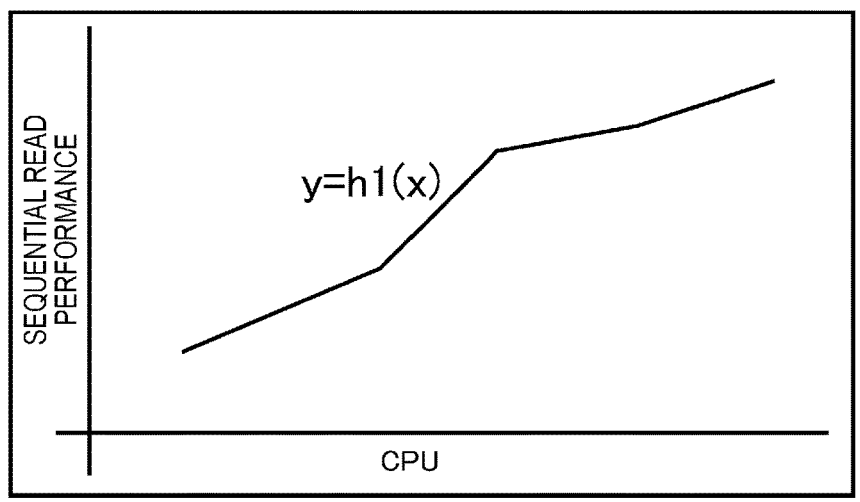

DATA STORE PERFORMANCE GRAPH 1301

FIG. 19

SEARCH RESULT 350

| DATA ID 351 | DATE AND TIME 352 | SIZE 353 | DOMESTIC MOVEMENT 354 | ABROAD MOVEMENT 355 | SITE 356 | DATA STORE ID 357 | TYPE 358 | PATH 359 |
|---|---|---|---|---|---|---|---|---|
| AAAA | – | xx | MOVABLE | MOVABLE | SITE 1 | DATA STORE A | Original | /Dir1/File1 |
| | XXXX/XX/XX XX:XX | xx | MOVABLE | MOVABLE | SITE 1 | DATA STORE A | Snapshot | /SnapshotX/Dir1/File1 |
| | | | | | SITE 2 | DATA STORE A | Replica | /ReplicatX/Dir1/File1 |
| ⋮ | | | | | | | | |

FIG. 21

ARRANGEMENT PLAN CALCULATION REQUEST SCREEN 1400

| APPLICATION | ○ APPLICATION A<br>○ APPLICATION B<br>● APPLICATION C | 1410 |
|---|---|---|
| TARGET DATA | <table><tr><th></th><th>DATA ID</th><th>SNAPSHOT DATE AND TIME</th><th>SIZE</th></tr><tr><td>☑</td><td>DDDD</td><td>XXXX/XX/XX XX:XX</td><td>xx</td></tr><tr><td>☑</td><td>EEEE</td><td>XXXX/XX/XX XX:XX</td><td>xx</td></tr></table><br>[ ADD DATA ] | 1420<br>1421<br>1422 |
| KPI | RESTRICTION 1  [ EXECUTION TIME ▼ ]<br>RESTRICTION LOWER LIMIT  [ 30 min ]<br>PRIORITY  [ 1 (PRIORITY) ▼ ]<br>ALLOWABLE RELAXATION WIDTH  [ 30 min ]<br>[ ADD RESTRICTION ]<br>OPTIMIZATION METHOD  [ COST MINIMIZATION ▼ ] | 1430<br>1431<br>1432<br>1433<br>1434<br>1435<br>1436 |

[ TRANSMIT ]  1440

METHOD OF ESTIMATING KPI FOR USING UP REMAINING RESOURCE

ARRANGEMENT PLAN SEARCH DEVICE, COMPUTER SYSTEM, AND ARRANGEMENT PLAN SEARCH METHOD

CROSS-REFERENCE TO RELATED APPLICATION

The present application claims priority from Japanese application JP 2022-041062, filed on Mar. 16, 2022, the contents of which is hereby incorporated by reference into this application.

BACKGROUND OF THE INVENTION

1. Field of the Invention

The present invention relates to a technique of searching for an arrangement plan of a plurality of microservices (for example, applications and data stores that store data used in applications) configuring a service that deals with data in a plurality of site systems.

2. Description of Related Art

In Artificial Intelligence (AI) or data analysis, data stored in distributed sites are utilized. In order to analyze data in consideration of costs or performance in a distributed site, setting of a resource amount allocated to an application (also simply referred to as "app") to be analyzed by a data analyzer, selection of a deployment destination site of a container where the analysis application is executed, and the like are necessary, and the number of steps increases.

For example, as a technique of allocating HW resources in a site, a technique of controlling computing resources allocated to VMs that execute applications is known (for example, refer to US2014/0380307A).

For example, when a plurality of sites are present, it is necessary to take into consideration a difference between execution environments of applications in sites, a status of resources in each of sites, and the like, and the resource control cannot be handled with the technique disclosed in US2014/0380307A.

SUMMARY OF THE INVENTION

The present invention has been made in consideration of the above-described circumstances, and an object thereof is to provide a technique capable of appropriately searching for an arrangement plan of microservices in a plurality of site systems.

In order to achieve the object, an arrangement plan search device according to one aspect is an arrangement plan search device for searching for an arrangement plan of a plurality of microservices configuring a service that deals with data in a plurality of site systems, the arrangement plan search device including: a storage unit; and a processor connected to the storage unit, in which the storage unit stores service resource amount performance information from which, in the plurality of site systems, a correspondence between performance of the service and information regarding resource amounts of hardware allocated to the plurality of microservices capable of implementing the performance of the service is identifiable, and the processor receives target performance information from which target performance of the service is identifiable from a user, determines microservice allocated resource amounts for the plurality of site systems based on the service resource amount performance information, the microservice allocated resource amounts being resource amounts of hardware allocated to the plurality of microservices that are required to implement the performance of the service identified from the target performance information, and searches for an arrangement plan of the plurality of microservices in the plurality of site systems capable of implementing the microservice allocated resource amounts.

According to the present invention, an arrangement plan of a plurality of microservices can be appropriately searched in each of a plurality of site systems.

BRIEF DESCRIPTION OF THE DRAWINGS

FIG. 3 is a configuration diagram illustrating a metadata database according to the first embodiment;

FIG. 4 is a configuration diagram illustrating a resource management table according to the first embodiment;

FIG. 5 is a configuration diagram illustrating an inter-site network management table according to the first embodiment;

FIG. 6 is a configuration diagram illustrating an execution environment management table according to the first embodiment;

FIG. 7 is a configuration diagram illustrating a performance model correction factor management table according to the first embodiment;

FIG. 8 is a configuration diagram illustrating an application management table according to the first embodiment;

FIG. 9 is a configuration diagram illustrating an application performance model management table according to the first embodiment;

FIG. 10 is a diagram illustrating the summary of an application performance model according to the first embodiment;

FIG. 11 is a configuration diagram illustrating a data store management table according to the first embodiment;

FIG. 12 is a configuration diagram illustrating a data store performance model management table according to the first embodiment;

FIG. 13 is a diagram illustrating the summary of a data store performance model according to the first embodiment;

FIG. 19 is a configuration diagram illustrating a search result of the inter-distributed site metadata search process according to the first embodiment;

FIG. 21 is a diagram illustrating one example of an arrangement plan calculation request screen according to the first embodiment;

DESCRIPTION OF EMBODIMENTS

Some embodiments will be described with reference to the drawings. The embodiments described below do not limit the present inventions according to the claims, and, all the elements described in the embodiments and combinations thereof are not necessarily indispensable for solving means of the invention.

In addition, in the following description, a process may be described using "program" as a subject of an operation. In this case, by executing a program using a processor (for example, a central processing unit (CPU)), a predetermined process is executed while appropriately using a storage resource (for example, a memory) and/or a communication interface device (for example, a network interface card (NIC)). Therefore, the subject of the process may be the processor. The process described using the program as the subject of the operation may be a process that is executed by a computer including a processor.

In the following description, information may be described using the expression "AAA table". However, the information may be expressed using any data structure. That is, in order to show that the information does not depend on the data structure, "AAA table" will also be referred to as "AAA information".

Figure 1:
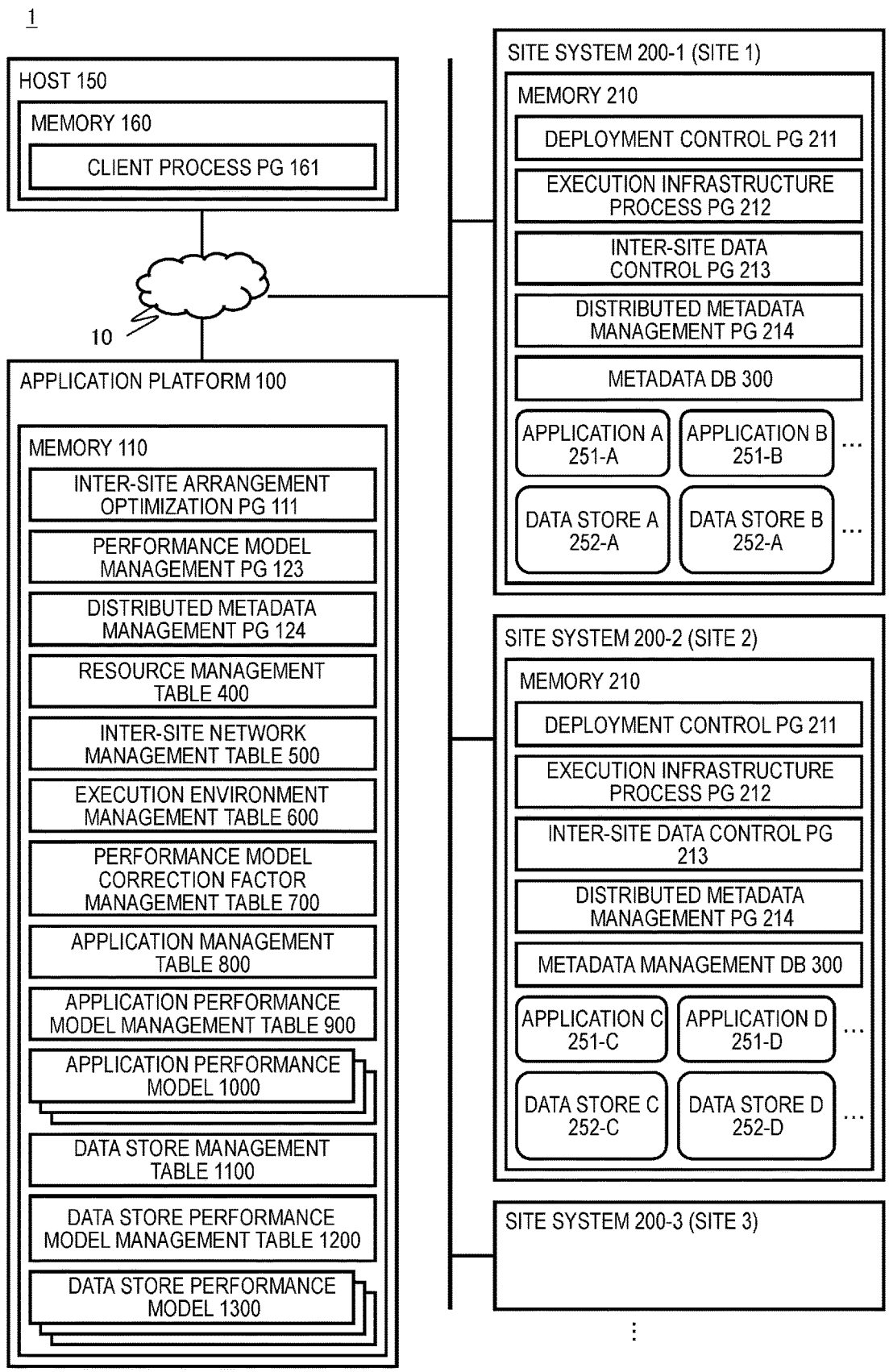
FIG. 1 is an overall configuration diagram illustrating a computer system according to a first embodiment.

FIG. 1 is an overall configuration diagram illustrating a computer system according to a first embodiment.

A computer system 1 includes an application platform 100 as an example of the arrangement plan search device, a host 150, a plurality of site systems 200 (200-1, 200-2, 200-3, and the like).

The application platform 100, the host 150, and the site systems 200 are connected via a network 10. The network 10 is, for example, a network such as a wide area network (WAN) or a local area network (LAN).

The host 150 is configured with, for example, a computer, receives various inputs from a manager, and executes a process with the application platform 100. The host 150 includes a memory 160. The memory 160 stores a client process program (PG) 161. The client process program 161 receives an instruction (an instruction to calculate an arrangement plan of containers that execute execution applications (also referred to as "apps") and data stores that store data used in the applications in the plurality of site systems 200 or an instruction to deploy a container or a data store) from the manager. For example, in response to the instruction to calculate the arrangement plan, the client process program 161 receives information (target performance information: for example, key performance indicator (KPI)) from which target performance of the application is identifiable, and transmits the target performance information to the application platform 100. In addition, the client process program 161 acquires various information from the application platform 100 and displays the information on a screen of the host 150.

The application platform 100 is configured with, for example, a computer (node 101 (refer to FIG. 2)). The application platform 100 includes a memory 110 as an example of the storage unit. The memory 110 stores an inter-site arrangement optimization program 111, a performance model management program 123, a distributed metadata management program 124, a resource management table 400, an inter-site network management table 500, an execution environment management table 600, a performance model correction factor management table 700, an application management table 800, an application performance model management table 900, an application performance model 1000, a data store management table 1100, a data store performance model management table 1200, and a data store performance model 1300.

The inter-site arrangement optimization program 111 executes a process of searching for an appropriate arrangement of containers that execute applications and data stores that store data used in the applications in the plurality of site systems 200. The performance model management program 123 executes a process of generating and managing the application performance model 1000 or the data store performance model 1300.

The distributed metadata management program 124 manages metadata regarding data stores 252 that are distributed and managed in the plurality of site systems 200. For example, the distributed metadata management program 124 has a function of searching for a metadata database (DB) 300 present in the plurality of site systems 200.

For example, the computer system 1 according to the embodiment includes, as the site systems 200, a site system 200-1, a site system 200-2, and a site system 200-3. The site system 200-1 is, for example, an edge, the site system 200-2 is, for example, an on-premises cloud, and the site system 200-3 is, for example, a public cloud. The site systems 200 have the same configuration. Therefore, here, the site system 200-1 will be described as an example.

The site system 200 is configured with one or more nodes 201 (refer to FIG. 2), allocates resources to a container that executes a program and a data store that manages data used in the program, and executes the container and the data store. The site system 200 includes a memory 210. The memory 210 stores a deployment control program 211, an execution infrastructure process program 212, an inter-site data control program 213, a distributed metadata management program 214, the metadata DB 300, applications 251 (251-A, 251-B, and the like), and the data stores 252 (252-A, 252-B, and the like).

The deployment control program 211 receives a deployment request of a container and a data store for executing an application corresponding to an arrangement plan from the inter-site arrangement optimization program 111, and instructs to execute the container and the data store in the execution infrastructure. The execution infrastructure process program 212 configures the execution infrastructure that executes the container with the node 201 configuring the site system 200, controls resource amounts allocated to a container that executes an application and a container that executes a data store based on a setting of amounts of hardware resources allocated corresponding to the arrangement plan from the application platform 100, and acquires an execution log in the execution infrastructure. In the embodiment, the container will be described as an implementation of the application in the execution infrastructure, but the present invention is not limited thereto. The application may be, for example, a virtual machine (VM) or a process. The inter-site data control program 213 receives a data movement request corresponding to the arrangement plan from the inter-site arrangement optimization program 111, and executes data movement between the site systems 200 corresponding to the data movement request. The distributed metadata management program 214 manages metadata regarding the data stores 252 that are distributed and managed in the plurality of site systems 200. For example, the distributed metadata management program 214 has a function of searching for the metadata DB 300 present in the plurality of site systems 200.

The application 251 is executed by the container, and issues an IC request (for example, a read request or a write request) to the data store 252. The data store 252 is executed by the container, stores data used in the application 251, receives an IC request from the application 251, and executes an IC process corresponding to the IC request. Here, in the embodiment, for example, each of the application 251 and the data store 252 corresponds to the microservice, and the service is configured with the application 251 and the data store 252.

Figure 2:
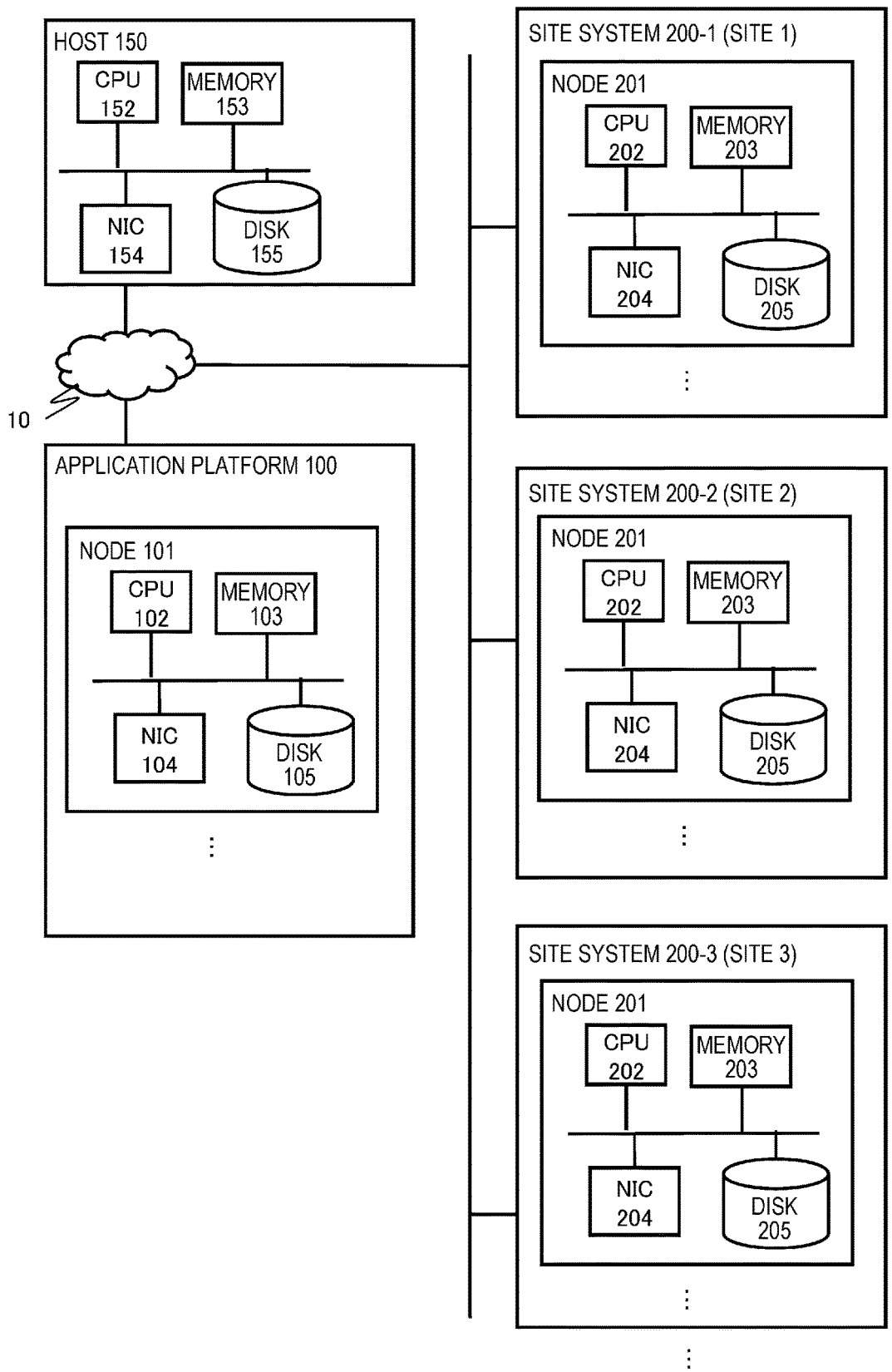
FIG. 2 is a hardware configuration diagram of the computer system according to the first embodiment.

FIG. 2 is a hardware configuration diagram of the computer system according to the first embodiment.

The host 150 includes a CPU 152, a memory 153, an NIC 154, and a disk 155.

The NIC 154 is, for example, an interface such as a wired LAN card or a wireless LAN card, and communicates with other devices (for example, the application platform 100 or the site systems 200) via the network 10.

The CPU 152 executes various processes in accordance with programs stored in the memory 153 and/or the disk 155.

The memory 153 is, for example, a random access memory (RAM) and stores programs that are executed by the CPU 152 or required information. In the embodiment, the memory 153 is the memory 160 illustrated in FIG. 1.

The disk 155 is, for example, a hard disk or a flash memory and stores programs that are executed by the CPU 152 or data that is used by the CPU 152.

The node 101 includes a CPU 102 as an example of the processor, a memory 103 as an example of the storage unit, an NIC 104, and a disk 105.

The NIC 104 is, for example, an interface such as a wired LAN card or a wireless LAN card, and communicates with other devices (for example, the host 150 or the site systems 200) via the network 10.

The CPU 102 executes various processes in accordance with programs stored in the memory 103 and/or the disk 105.

The memory 103 is, for example, a RAM and stores programs that are executed by the CPU 102 or required information. In the embodiment, the memory 103 is the memory 110 illustrated in FIG. 1.

The disk 105 is, for example, a hard disk or a flash memory and stores programs that are executed by the CPU 102 or data that is used by the CPU 102.

The node 201 includes a CPU 202, a memory 203, an NIC 204, and a disk 205.

The NIC 204 is, for example, an interface such as a wired LAN card or a wireless LAN card, and communicates with other devices (for example, the host 150, the application platform 100, or the other nodes 201) via the network 10.

The CPU 202 executes various processes in accordance with programs stored in the memory 203 and/or the disk 205.

The memory 203 is, for example, a RAM and stores programs that are executed by the CPU 202 or required information. In the embodiment, the memories 203 of one or more nodes 201 correspond to the memory 210 illustrated in FIG. 1.

The disk 205 is, for example, a hard disk or a flash memory and stores programs that are executed by the CPU 202 or data that is used by the CPU 202.

FIG. 3 is a configuration diagram illustrating the metadata database according to the first embodiment. Set values in the metadata database illustrated in FIG. 3 are examples of set values in the metadata database 300 of the site system 200 of a site 1.

The metadata database (DB) 300 is provided in for each of the site systems 200, and stores entries for each of data units (files and objects) managed by the site system 200. The entries of the metadata database 300 include fields of a data store ID 301, a data ID 302, a date and time 303, a type 304, a path 305, a size 306, a replica source site 307, a domestic movement 308, and an abroad movement 309. The entries may include information such as a label representing the content of a file that can be used for search.

The data store ID 301 stores an identifier (data store ID) of a data store that stores the data unit corresponding to the entry. The data ID 302 stores an identifier (data ID) of the data unit corresponding to the entry. The date and time 303 stores the date and time relating to the data unit corresponding to the entry. For example, when the data unit is a snapshot, the date and time of the snapshot is stored. When the data unit is a replica, the date and time of replication is stored. The type 304 stores types of data units. The types of the data units include, for example, Original representing typical data, Snapshot, and Replica. The path 305 stores a path of a storage location where the data unit corresponding to the entry is stored. The path may be a URL of the storage location of the data unit, a URL of a database that stores the data unit, or a table name that stores the data unit. The size 306 stores a data size of the data unit corresponding to the entry. The replica source site 307 stores a site name of a site as a replica source of the data unit corresponding to the entry when the type of the data unit is a replica. The domestic movement 308 stores whether or not the data unit corresponding to the entry is movable to another domestic site. The abroad movement 309 stores whether or not the data unit corresponding to the entry is movable to another abroad site.

FIG. 4 is a configuration diagram illustrating the resource management table according to the first embodiment.

The resource management table 400 is a table for managing resources for the site systems 200 of the sites. The resource management table 400 stores entries for each of the site systems 200. The entries of the resource management table 400 include fields of a site ID 401, a country 402, an execution environment ID 403, a number of cores 404, a memory 405, a CPU usage 406, a memory usage 407, a number of node cores 408, a node memory 409, a cost 410, a power 411, a data transfer cost (In) 412, and a data transfer cost (Out) 413.

The site ID 401 stores an ID (site ID) of a site where the site system 200 corresponding to the entry is present. The country 402 stores identification information of a country where the site system 200 corresponding to the entry is present. The execution environment ID 403 stores an ID (execution environment ID) of an execution environment in the site system 200 corresponding to the entry. Here, even when sites are different, the execution environments of the site systems 200 may be the same. In the site systems 200 having the same execution environment, the same model can be used as the performance model of the application. Therefore, in the embodiment, the types of the execution environments in the site systems 200 are managed.

The number of cores 404 stores the number of cores of the CPU 202 in the site system 200 corresponding to the entry. The memory 405 stores a memory amount of the memory 203 in the site system 200 corresponding to the entry. The CPU usage 406 stores a usage of the CPU in the site system 200 corresponding to the entry. The memory usage 407 stores a usage of the memory in the site system 200 corresponding to the entry. The number of node cores 408 stores the number of cores of the CPU 202 in one node 201 of the site system 200 corresponding to the entry. The node memory 409 stores a memory amount in one node 201 of the site system 200 corresponding to the entry. The cost 410 stores a cost required for one node 201 in the site system 200 corresponding to the entry. The power 411 stores a power amount required for one node 201 in the site system 200 corresponding to the entry. The data transfer cost (In) 412 stores a cost required to transfer data to the site system 200 corresponding to the entry. The data transfer cost (Out) 413 stores a cost required to transfer data from the site system 200 corresponding to the entry.

FIG. 5 is a configuration diagram illustrating the inter-site network management table according to the first embodiment.

The inter-site network management table 500 manages information regarding the network 10 between the sites in the computer system 1. The inter-site network management table 500 includes a network bandwidth management table 510 and a network latency management table 520.

The network bandwidth management table 510 is a table that manages the bandwidth of the network between the sites. In the network bandwidth management table 510, each of rows of a transfer source site 511 stores a site name as a transfer source, and each of columns of a transfer destination site 512 stores a site name as a transfer destination. A cell corresponding to the site name as the transfer source of the transfer source site 511 and the site name as the transfer destination of the transfer destination site 512 stores the bandwidth of the network between the transfer source site and the transfer destination site.

The network latency management table 520 is a table that manages the latency of the network between the sites. In the network latency management table 520, each of rows of a transfer source site 521 stores a site name as a transfer source, and each of columns of a transfer destination site 522 stores a site name as a transfer destination. A cell corresponding to the site name as the transfer source of the transfer source site 521 and the site name as the transfer destination of the transfer destination site 522 stores the latency of the network between the transfer source site and the transfer destination site.

FIG. 6 is a configuration diagram illustrating the execution environment management table according to the first embodiment.

The execution environment management table 600 is a table that manages execution environments of applications and data stores. The execution environment management table 600 stores entries for each of the execution environments. The entries of the execution environment management table 600 includes fields of an execution environment ID 601, a type 602, a CPU type 603, a CPU frequency 604, and a memory type 605.

The execution environment ID 601 stores an ID of the execution environment corresponding to the entry. The type 602 stores a type of the execution environment corresponding to the entry. The CPU type 603 stores a type of the CPU in the execution environment corresponding to the entry. The CPU frequency 604 stores a frequency of the CPU in the execution environment corresponding to the entry. The memory type 605 stores a type of the memory in the execution environment corresponding to the entry.

FIG. 7 is a configuration diagram illustrating the performance model correction factor management table according to the first embodiment. FIG. 7 is a table that manages a correction factor for correcting the number of CPU cores in each of an application performance model and a data store performance model.

The performance model correction factor management table 700 is an example of the first correction information, the second correction information, and the third correction information, is an example of the application resource amount performance information, the application data store performance information, the data store resource amount performance information, and the service resource amount performance information, and is a table that manages correction factors and margins of the performance models between the execution environments. In the performance model correction factor management table 700, each of rows of a correction source execution environment 701 stores an execution environment ID as a correction source, and each of columns of a correction destination execution environment 702 stores an execution environment ID as a correction destination. A cell corresponding to the execution environment ID as the correction source of the correction source execution environment 701 and the execution environment ID as the correction destination of the correction destination execution environment 702 stores a correction factor of a resource (in the example of FIG. 7, the CPU core) and a margin in consideration of an error for correction between the correction source execution environment and the correction destination execution environment. In a cell corresponding to the correction source execution environment ID and the correction destination execution environment ID where conversion by the correction factor is not applicable to the performance model, Not Available (N/A) is set. The performance model correction factor management table 700 may include a table that manages correction factors for correcting resources for the performance model of each of resources (for example, a memory, an NIC bandwidth, a block IC (the bandwidth of IC of a disk device), and a data store) other than the CPU core. In addition, the performance model correction factor management table 700 may be provided as different tables for applications and data stores, and may be provided for each of applications.

FIG. 8 is a configuration diagram illustrating the application management table according to the first embodiment.

The application management table 800 is a table that manages applications to be executed in the execution infrastructure of the site system 200. The application management table 800 stores entries for each of applications. The entries of the application management table 800 includes fields of an application ID 801, a description 803, and a non-executable site 804.

The application ID 801 stores an ID of the application corresponding to the entry. The description 803 stores description of a process content of the application corresponding to the entry. The non-executable site 804 stores a site name of a site where the application corresponding to the entry is non-executable.

FIG. 9 is a configuration diagram illustrating the application performance model management table according to the first embodiment.

The application performance model management table 900 is provided for each of applications, and manages a performance model (an example of the application resource amount performance information) representing a correspondence between performance of an application and a resource allocated to the application and a performance model (an example of the application data store performance information) representing a correspondence between performance of an application and performance of a data store allocated to the application. The application performance model management table 900 includes fields of an application ID 901, an execution environment 902, a performance index 910, an allocated resource 920, and an allocated data store performance 930.

The application ID 901 stores an ID of the application corresponding to the application performance model management table 900. The execution environment 902 stores an execution environment name corresponding to the performance model managed by the application performance model management table 900. The performance index 910 stores a performance index of an application as a target of the performance model in the application performance model management table 900.

The allocated resource 920 stores performance models for one or more allocated resources. The allocated resource 920 includes fields of a CPU 921, a memory 922, an NIC bandwidth 923, and a block IO 924. The CPU 921 stores a performance model representing a correspondence between performance of an application and the number of cores of a CPU allocated to the application. The memory 922 stores a performance model representing a correspondence between performance of an application and a memory amount of a memory allocated to the application. The NIC bandwidth 923 stores a performance model representing a correspondence between performance of an application and a bandwidth of an NIC allocated to the application. The block IC 924 stores a performance model representing a correspondence between performance of an application and a block IC allocated to the application.

The allocated data store performance 930 stores a performance model representing a correspondence between performance of an application and performance of a data store allocated to the application. The allocated data store performance 930 includes fields of a data store type 931, an IC operation 932, and a performance model 934. The data store type 931 stores a type of the allocated data store. The IC operation 932 stores a type of an IC operation that is executed by the allocated data store. The IC operation refers to an IC operation on the data store. For example, when the data store is a File data store, the IC operation refers to Sequential Read/Write, Random Read/Write, or a metadata operation (for example, file creation/deletion or directory creation/deletion). When the data store is a NoSQL data store, the IC operation refers to insertion, deletion, search, or the like of data for the database (DB). The performance model 934 stores a performance model representing a correspondence between performance of an application and performance of a data store during execution of the IC operation of the IC operation 932 in the data store of the type of the data store type 931.

Here, generation of an application performance model and registration of the application performance model will be described.

FIG. 10 is a diagram illustrating the summary of the application performance model according to the first embodiment.

Regarding the generation of an application performance model, for example, a graph 1001 of performance of an application relative to a change in the allocated resource amount (in FIG. 10, the number of cores of the CPU) may be generated as illustrated in FIG. 10, and an equation $y=f1(x)$ of an approximated curve of the graph may be set as the application performance model. Here, y represents the performance of the application per node, and x represents the allocated resource amount per node. y can be calculated by dividing the result (the total performance of the application) of the performance measurement by the performance model management program 123 by the number of nodes that execute the application. In other words, when y is multiplied by the number of nodes of the application, the total performance of the application is obtained. The generation of the graph and the derivation of the approximated curve equation during the generation of the application performance model can be implemented using, for example, existing spreadsheet software or program.

FIG. 11 is a configuration diagram illustrating the data store management table according to the first embodiment.

The data store management table 1100 is a table that manages data stores to be executed in the execution infrastructure of the site system 200. The data store management table 1100 stores entries for each of the data stores. The entries of the data store management table 1100 include fields of a data store ID 1101 and a type 1102.

The data store ID 1101 stores an ID of the data store corresponding to the entry. The type 1102 stores a type of the data store corresponding to the entry. The types of the data stores include, for example, File representing a data store that deals with files, Object representing a data store that deals with objects, and SQL representing a data store that deals with SQLs.

FIG. 12 is a configuration diagram illustrating the data store performance model management table according to the first embodiment.

The data store performance model management table 1200 is provided for each of the data stores and manages a performance model (an example of the data store resource amount performance information) representing a correspondence between performance of a data store and a resource allocated to the data store. The data store performance model management table 1200 includes fields of a data store ID 1201, an execution environment 1202, an IC operation 1211, a CPU 1212, a memory 1213, an NIC bandwidth 1214, and a block IC 1215.

The data store ID 1201 stores an ID of the data store corresponding to the data store performance model management table 1200. The execution environment 1202 stores an execution environment ID corresponding to the performance model managed by the data store performance model management table 1200.

The IC operation 1211 stores a type of an IC operation as a target of the performance model of the data store. The CPU 1212 stores a performance model representing a correspondence between performance of a data store for the type of the IC operation of the IC operation 1211 corresponding to the field and the number of cores of the CPU allocated to the data store. The memory 1213 stores a performance model representing a correspondence between performance of a data store for the type of the IC operation of the IC operation 1211 corresponding to the field and the memory amount of the memory allocated to the data store. The NIC bandwidth 1214 stores a performance model representing a correspondence between performance of a data store for the type of the IC operation of the IC operation 1211 corresponding to the field and the bandwidth of the NIC allocated to the data store. The block IC 1215 stores a performance model representing a correspondence between performance of a data store for the type of the IC operation of the IC operation 1211 corresponding to the field and the block IC allocated to the data store.

Here, generation of a data store performance model and registration of the data store performance model will be described.

FIG. 13 is a diagram illustrating the summary of the data store performance model according to the first embodiment.

Regarding the generation of a data store performance model, for example, a graph 1301 of performance of a data store relative to a change in the allocated resource amount may be generated as illustrated in FIG. 13, and an equation y=h1(x) of an approximated curve of the graph may be set as the data store performance model. Here, y represents the performance of the data store per node, and x represents the allocated resource amount per node. y can be calculated by dividing the result (the total performance of the data store) of the performance measurement by the performance model management program 123 by the number of nodes of the data store. In other words, when y is multiplied by the number of nodes of the data store, the total performance of the data store is obtained. The generation of the graph and the derivation of the approximated curve equation during the generation of the data store performance model can be implemented using, for example, existing spreadsheet software or program.

Here, in the embodiment, the application resource amount performance information, the application data store performance information, and the data store resource amount performance information correspond to the service resource amount performance information.

Next, a data store performance model generation process S600 of generating a data store performance model will be described. The data store performance model generation process S600 is executed, for example, when a data store is newly registered in the site system 200.

Figure 14:
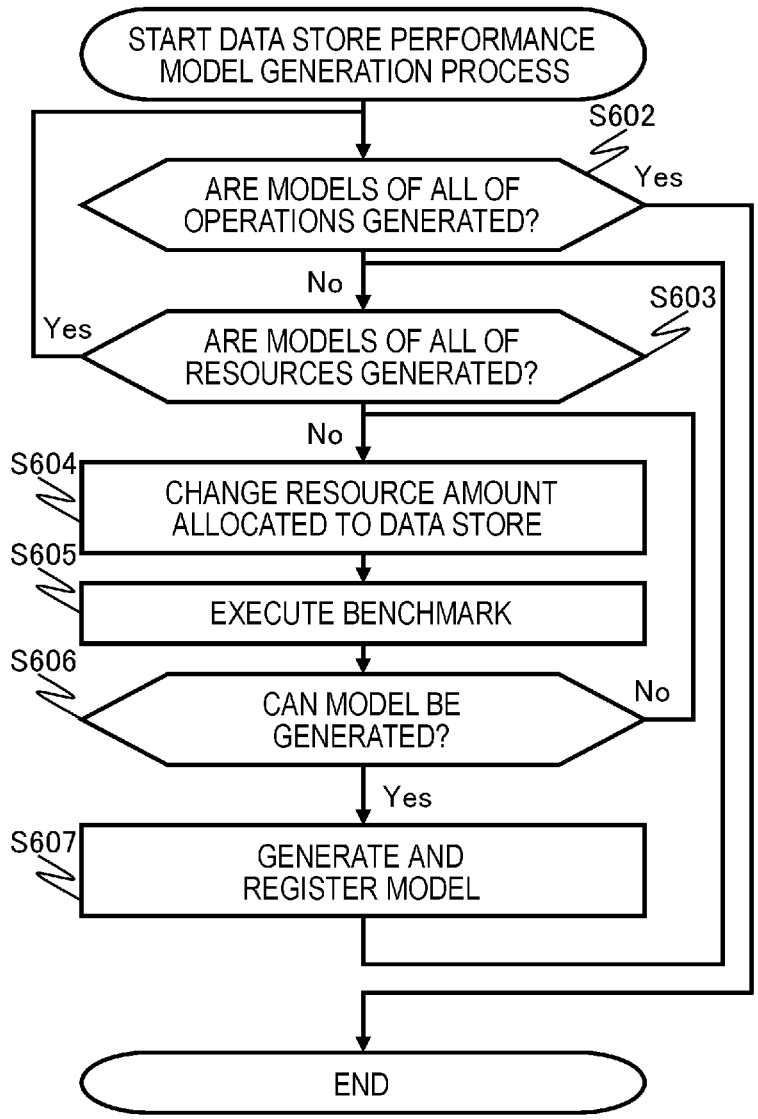
FIG. 14 is a flowchart illustrating a data store performance model generation process according to the first embodiment.

FIG. 14 is a flowchart illustrating the data store performance model generation process according to the first embodiment.

In the data store performance model generation process according to the embodiment, the data store performance model is generated for each of types of operations of data stores. In addition, in the embodiment, the data store performance model for each of the types of the operations is generated for each of resources of hardware. Here, the resources of hardware include a CPU, a memory, an NIC bandwidth, and a block IC. In this data store performance model generation process, a data store performance model representing a relationship between the allocated amount of each of the resources and performance of the data store in the allocated amount is generated for each of the types of the operations.

First, the performance model management program 123 (to be exact, the CPU 102 that executes the performance model management program 123) checks whether or not the data store performance models of the types of all of the operations of the data stores are generated (Step S602). As a result, when the performance models of the types of all of the operations are generated (Step S602: Yes), the performance model management program 123 ends the data store performance model generation process S600.

On the other hand, when the data store performance models of the types of all of the operations are not generated (Step S602: No), the performance model management program 123 generates the data store performance model for a type of an operation for which the performance model is not generated. Here, the operation type as the target will be referred to as the target operation type.

First, the performance model management program 123 checks whether or not the data store performance models of all of the resources as targets for which the data store performance model is generated for the target operation type (Step S603).

As a result, when the data store performance models of all of the resources as the target are generated for the target operation type (Step S603: Yes), the performance model management program 123 proceeds the process to Step S602.

On the other hand, when the data store performance models of all of the resources as the target are not generated (Step S603: No), the performance model management program 123 generates the data store performance model for a resource (referred to as the target resource) for which the performance model is not generated. Here, when the data store performance model of the target resource is generated, the allocated amounts of resources other than the target resource are adjusted not to impose a bottleneck on the performance of the target resource, and the allocated resource amount of the target resource is gradually changed to generate the data store performance model.

First, the performance model management program 123 changes the resource amount allocated to the data store (Step S604). The change in the allocated resource amount in the data store is executed in association with the execution infrastructure process program 212 of the site system 200. Specifically, the performance model management program 123 transmits the resource amount allocated to the data store to the execution infrastructure process program 212 of the site system 200. As a result, the execution infrastructure process program 212 receives the allocated resource amount and allocates the resource corresponding to the allocated resource amount to the data store. The allocation of the resource in the node 201 of the site system 200 can be implemented by an existing program or software. For example, in a Linux (registered trade name) operating system, a resource allocation function called Cgroups can be used. By using Cgroups, a predetermined amount of the resource can be allocated to the program that operates in the Linux operating system.

Next, the performance model management program 123 executes the performance measurement for the target operation type of the data store (Step S605).

Next, the performance model management program 123 determines whether or not the data store performance model can be generated, specifically, whether or not the performance measurement is executed a number of times required to generate the data store performance model (Step S606).

As a result, when the measurement is not executed the number of times required to generate the data store performance model (Step S606: No), the performance model management program 123 proceeds the process to Step S604 and repeats the change of the allocated resource amount and the execution of the performance measurement. The number of times the performance measurement is executed to generate the data store performance model and the allocated resource amount that changes for each performance measurement are predetermined.

On the other hand, when the measurement is executed the number of times required to generate the data store performance model (Step S606: Yes), the performance model management program 123 generates the data store performance model based on the plurality of measurement results, registers the generated data store performance model in the data store performance model management table 1200 (Step S607), and proceeds the process to Step S603.

Next, an application performance model generation process S700 of generating an application performance model will be described. The application performance model generation process S700 is executed, for example, when an application is newly registered in the site system 200.

Figure 15:
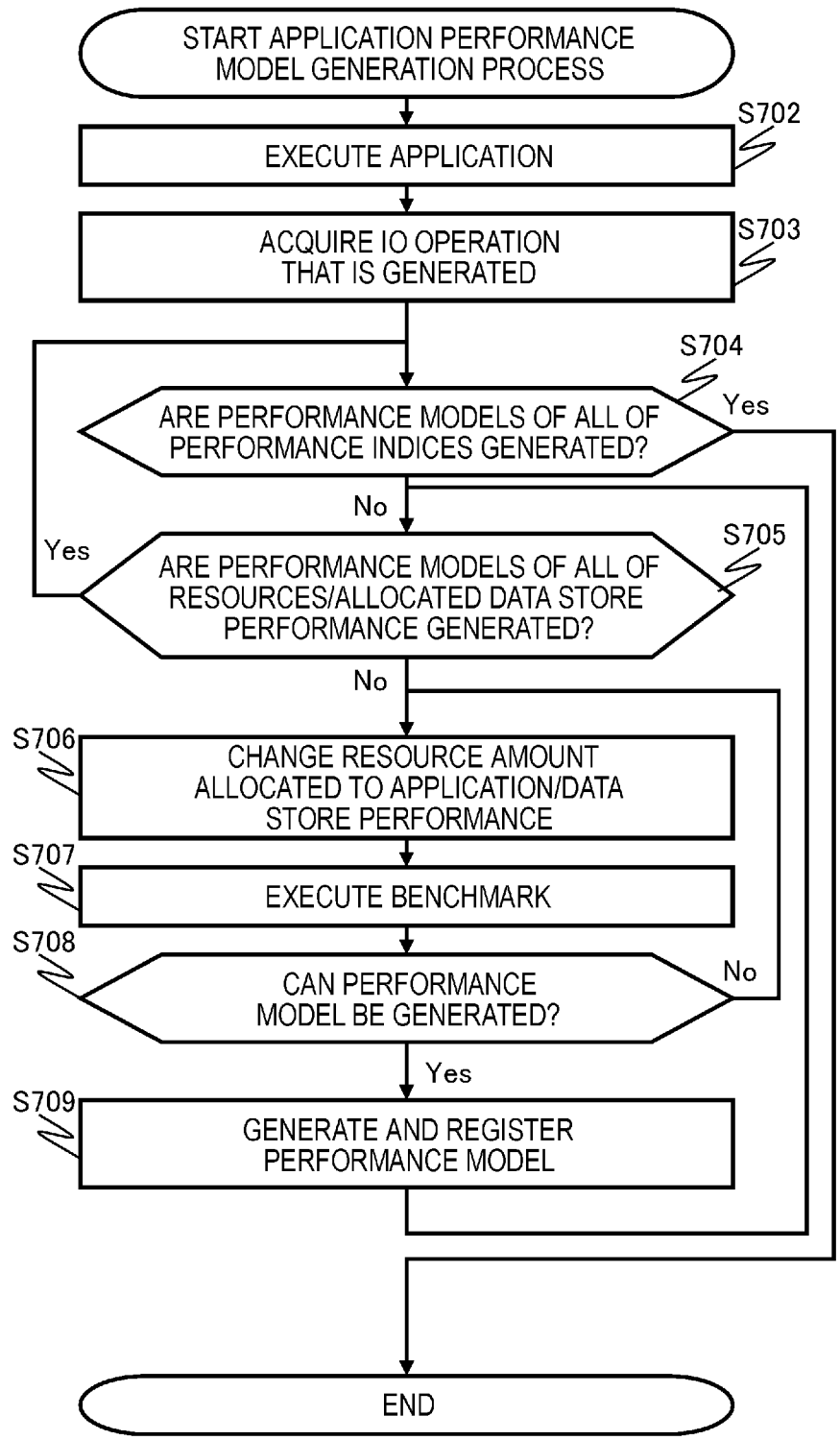
FIG. 15 is a flowchart illustrating an application performance model generation process according to the first embodiment.

FIG. 15 is a flowchart illustrating the application performance model generation process according to the first embodiment.

In the application performance model generation process according to the embodiment, the application performance model is generated for each of types of operations of applications. When a plurality of algorithms are selectively executed in the application, an application performance model for each of the algorithms may be generated for one application. In addition, when a plurality of processing phases are present in the application, an application performance model for each of the processing phases may be generated. In addition, when a plurality of types of data that can be processed by the application are present, the application performance model may be generated for each of the types of the data. Examples of the types of the data include data of the database, a file, block data, an image file, a video file, and a sound file. In addition, the performance model may be generated for each of combinations of a setting file and an analysis target file.

First, the performance model management program 123 (to be exact, the CPU 102 that executes the performance model management program 123) transmits an instruction to execute an application as a target for which the performance model is generated to the execution infrastructure process program 212 to execute the application (Step S702).

The performance model management program 123 acquires a type of an operation that is generated by the executed application (Step S703).

Next, the performance model management program 123 checks whether or not the application performance models of all of the performance indices of the application are generated. (Step S704). As a result, when the performance models of all of the performance indices are generated (Step S704: Yes), the performance model management program 123 ends the application performance model generation process S700.

On the other hand, when the application performance model is not generated for performance indices (Step S704: No), the performance model management program 123 generates the application performance model for a performance index for which the performance model is not generated. Here, the performance index as the target will be referred to as the target performance index.

First, the performance model management program 123 checks whether or not the application performance models of all of the resources and the like (the resources and the data store performance) as the targets of the application performance model generation for the target performance index (Step S705).

As a result, when the application performance models of all of the resources and the like as the target are generated for the target performance index (Step S705: Yes), the performance model management program 123 proceeds the process to Step S704.

On the other hand, when the application performance models of all of the resources and the like as the target are not generated (Step S705: No), the performance model management program 123 generates the application performance model for a resource (referred to as the target resource and the like) for which the performance model is not generated. Here, when the application performance model of the target resource and the like is generated, the allocated amounts of resources and the like other than the target resource and the like are adjusted not to impose a bottleneck on the performance of the target resource and the like, and the allocated amount of the target resource is gradually changed to generate the application performance model.

First, the performance model management program 123 changes the resource amount allocated to the data store (allocated resource amount) or the data store performance allocated to the data store (allocated data store performance) (Step S706). The change in the allocated resource amount or the allocated data store performance in the data store is executed in association with the execution infrastructure process program 212 of the site system 200. Specifically, the performance model management program 123 transmits the amount allocated to the application and/or the amount allocated to the data store to the execution infrastructure process program 212 of the site system 200. Here, for the allocated data store performance, the performance model management program 123 identifies the resource amount of the data store required to implement the allocated data store performance based on the data store performance model 1300 of the data store performance model management table 1200, and sets the resource amount as the amount allocated to the data store. As a result, the execution infrastructure process program 212 receives the allocated amount and allocates the resource and the like corresponding to the received allocated amount to the data store. The allocation of the resource and the like in the node 201 of the site system 200 can be implemented by an existing program or software. For example, in a Linux (registered trade name) operating system, an allocation function called Cgroups can be used. By using Cgroups, a predetermined amount of the resource can be allocated to the program that operates in the Linux operating system.

Next, the performance model management program 123 executes performance measurement for the target performance index of the application (Step S707).

Next, the performance model management program 123 determines whether or not the application performance model can be generated, specifically, whether or not the performance measurement is executed a number of times required to generate the application performance model (Step S708).

As a result, when the measurement is not executed the number of times required to generate the application performance model (Step S708: No), the performance model management program 123 proceeds the process to Step S706 and repeats the change of the allocated amount and the execution of the performance measurement. The number of times the performance measurement is executed to generate the application performance model and the allocated amount that changes for each performance measurement are predetermined.

On the other hand, when the measurement is executed the number of times required to generate the application performance model (Step S708: Yes), the performance model management program 123 generates the application performance model based on the plurality of measurement results, registers the generated application performance model in the application performance model management table 900 (Step S709), and proceeds the process to Step S705.

Next, a performance model correction factor measurement process S800 of measuring the correction factor of the performance model depending on a difference in execution environment will be described. The performance model correction factor measurement process S800 is executed when a new execution environment is registered in the computer system 1.

Figure 16:
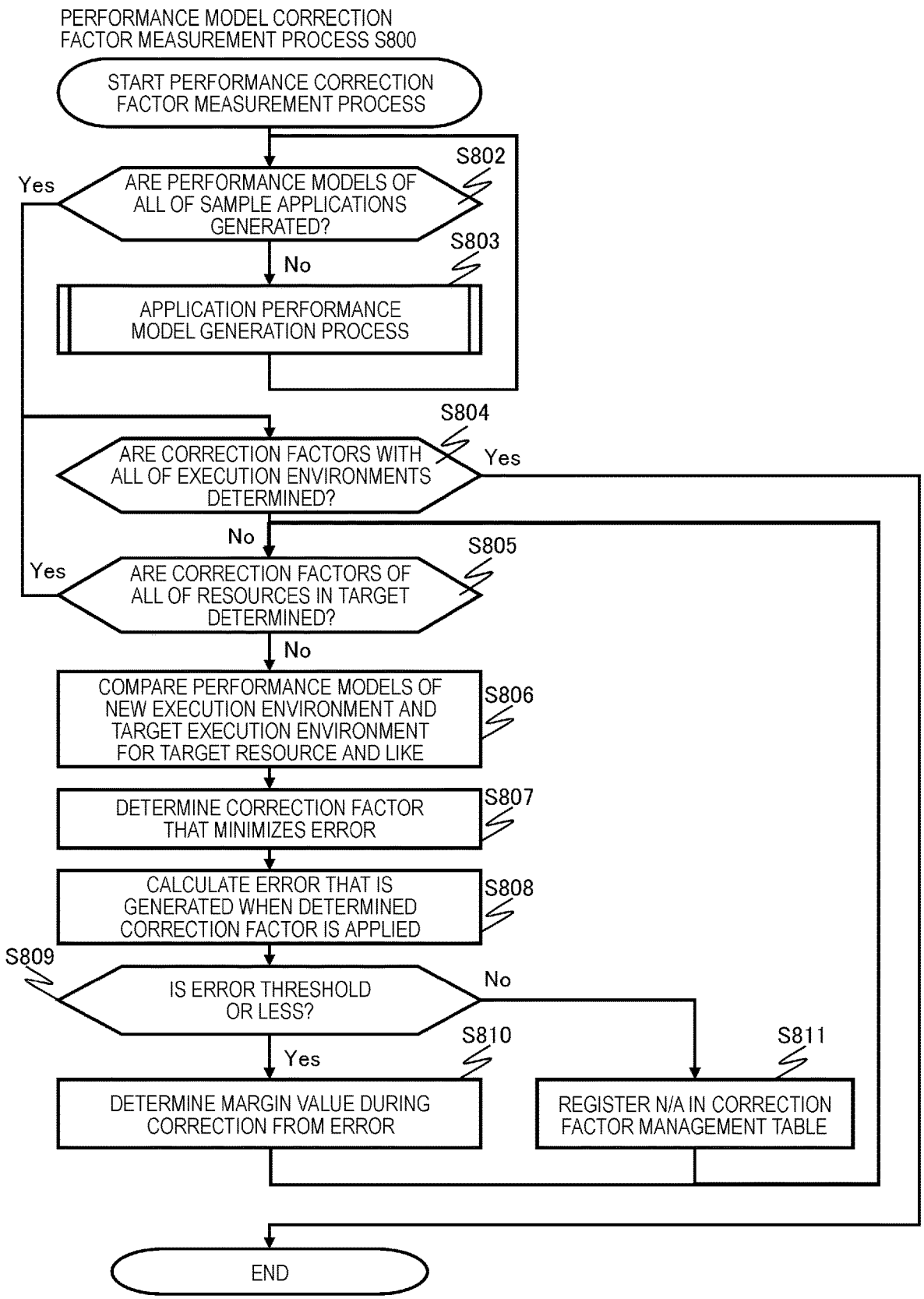
FIG. 16 is a flowchart illustrating a performance model correction factor measurement process according to the first embodiment.

FIG. 16 is a flowchart illustrating the performance model correction factor measurement process according to the first embodiment.

First, the performance model management program 123 (to be exact, the CPU 102 that executes the performance model management program 123) checks whether or not the application performance models of all of the applications (sample applications) prepared as samples are generated in a new execution environment (referred to as the new execution environment) (Step S802). As a result, when the application performance models of all of the sample applications are generated (Step S802: Yes), the performance model management program 123 proceeds the process to Step S804.

On the other hand, when the application performance models of all of the sample applications are not generated (Step S802: No), the performance model management program 123 executes the application performance model generation process (S700) of generating the application performance model for a sample application for which the performance model is not generated (Step S803), and proceeds the process to Step S802.

In Step S804, the performance model management program 123 determines whether or not the correction factors of the performance models between the new execution environment and all of the other execution environments are determined. As a result, when the performance model management program 123 determines that the correction factors of the performance models between the new execution environment and all of the other execution environments are determined (Step S804: Yes), the performance model management program 123 ends the performance model correction factor measurement process.

On the other hand, when the performance model management program 123 determines that the correction factors of the performance models between the new execution environment and all of the other execution environments are not determined (Step S804: no), the performance model management program 123 executes the processes of Step S805 and subsequent steps on another execution environment for which the correction factor is not determined. Here, the other execution environment as the processing target will be referred to as the target execution environment.

The performance model management program 123 determines whether or not the correction factors of the performance models for all of the resources and the data store performance (resources and the like) between the new execution environment and the target execution environment are determined (Step S805).

As a result, when the performance model management program 123 determines that the correction factors of the performance models for all of the resources and the data store performance of the target execution environment are determined (Step S805: Yes), the performance model management program 123 proceeds the process to Step S804.

On the other hand, when the performance model management program 123 determines that the correction factors of the performance models for all of the resources and the data store performance of the target execution environment are not determined (Step S805: No), the performance model management program 123 executes the processes of Step S806 and subsequent steps on any one of the resources and the like for which the correction factor is not determined as a processing target.

In Step S806, the performance model management program 123 compares the performance models of the new execution environment and the target execution environment for the target resource and the like (Step S806). The performance model of the target execution environment is prepared in the previous performance model correction factor measurement process S800 executed when the target execution environment is newly generated, and is stored in the application platform 100.

Next, the performance model management program 123 determines a correction factor that minimizes an error of the performance models (Step S807), and calculates an error that is generated when the determined correction factor is applied (Step S808). Here, the error may be an arithmetical mean or a geometric mean.

Next, the performance model management program 123 determines whether or not the error is less than or equal to a threshold (Step S809). Here, the error used for the comparison may be the average of errors or may be the maximum error.

As a result, when the error is less than or equal to the threshold (Step S809: Yes), the performance model management program 123 determines a margin value during the correction from the error (Step S810) and proceeds the process to Step S805. For example, when the error after the correction is 10%, a magnification corresponding to a value obtained by adding a margin of 10% to the value may be set as the margin value.

On the other hand, when the error is not less than or equal to the threshold (Step S809: No), the performance model management program 123 registers N/A representing not correctable as the correction factor corresponding to the performance model correction factor management table 700 (Step S811), and proceeds the process to Step S805.

In the performance model correction factor measurement process, the correction factors of the performance models of the new execution environment and the existing execution environments can be determined and registered in the performance model correction factor management table 700. As a result, based on the correction factors of the performance model correction factor management table 700, the required resource amount and the like in one execution environment can be easily and appropriately figured out from the required resource amount and the like obtained by the performance model in another execution environment.

Next, an inter-distributed site metadata search process S900 will be described. The inter-distributed site metadata search process S900 is executed when the application platform 100 receives a search request of a user for data from the host 150.

Figure 17:
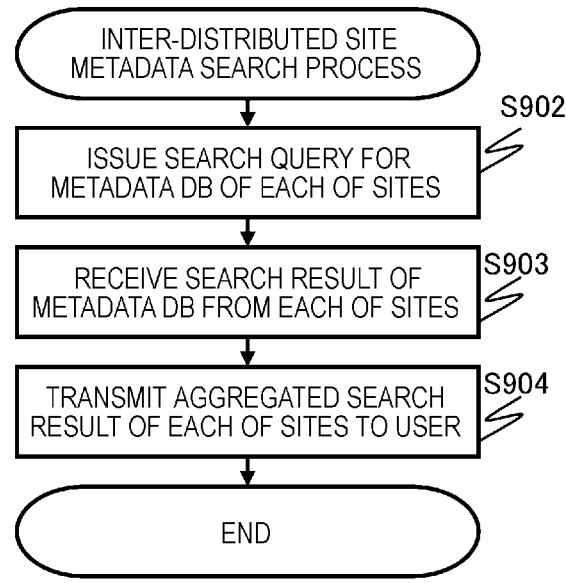
FIG. 17 is a flowchart illustrating an inter-distributed site metadata search process according to the first embodiment.

FIG. 17 is a flowchart illustrating the inter-distributed site metadata search process according to the first embodiment.

The distributed metadata management program 124 (to be exact, the CPU 102 that executes the distributed metadata management program 124) issues a search query to the metadata DB 300 of each of the site systems 200 based on the received search request (Step S902). In the site system 200 as the issuance destination of the search query, when the search query is received, an in-site metadata search process S950 (refer to FIG. 18) is executed.

Next, the distributed metadata management program 124 receives the search result of each of the metadata DBs 300 based on each of the search queries from each of the sites (Step S903), and the distributed metadata management program 124 aggregates the search results received from the sites, and responds to the host 150 that transmits the search request, that is, transmits the aggregated search result (refer to FIG. 19) (Step S904).

In the inter-distributed site metadata search process S900, by returning the search result corresponding to the search request of the user to the host 150, the user can appropriately figure out desired data.

Next, the in-site metadata search process S950 will be described. The in-site metadata search process S950 is executed, for example, when the site system 200 receives the search query from the application platform 100.

Figure 18:
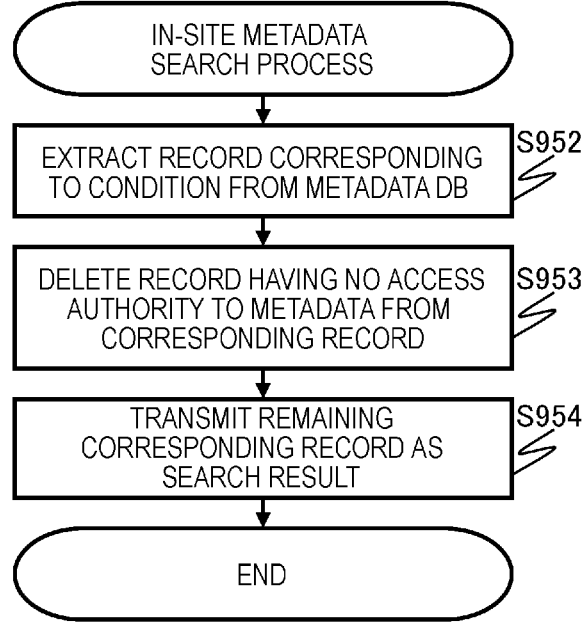
FIG. 18 is a flowchart illustrating an in-site metadata search process according to the first embodiment.

FIG. 18 is a flowchart illustrating the in-site metadata search process according to the first embodiment.

The distributed metadata management program 214 of the site system 200 (to be exact, the CPU 202 that executes the distributed metadata management program 214) that acquires the search query extracts records corresponding to a condition of the search query from the metadata DB 300 (Step S952).

Next, the distributed metadata management program 214 deletes a record of metadata to which the user of the search request does not have access authority from the extracted records (Step S953).

Next, the distributed metadata management program 214 transmits the remaining records as the search result to the application platform 100 as the issuance source of the search query (Step S954).

In the in-site metadata search process, the search result of the search query for the metadata DB 300 in the site system 200 returns to the issuance source of the search query.

Next, a search result 350 of the inter-distributed site metadata search process S900 will be described.

FIG. 19 is a configuration diagram illustrating the search result of the inter-distributed site metadata search process according to the first embodiment.

The search result 350 includes entries for data obtained by search. The entries of the search result 350 include fields of a data ID 351, a date and time 352, a size 353, a domestic movement 354, an abroad movement 355, a site 356, a data store ID 357, a type 358, and a path 359.

The data ID 351 stores an identifier (data ID) of the data unit corresponding to the entry. In the embodiment, a snapshot or a replica of one data unit has the same data ID as the data unit. The date and time 352 stores the date and time relating to the data unit corresponding to the entry. For example, when the data unit is a snapshot, the date and time of the snapshot is stored. When the data unit is a replica, the date and time of replication is stored. The size 353 stores a data size of the data unit corresponding to the entry. The domestic movement 354 stores whether or not the data unit corresponding to the entry is movable to another domestic site. The abroad movement 355 stores whether or not the data unit corresponding to the entry is movable to another abroad site. The site 356 stores a site name of a site where the data unit corresponding to the entry is stored. The data store ID 357 stores an identifier (data store ID) of a data store that stores the data unit corresponding to the entry. The type 358 stores types of data units. The types of the data units include, for example, Original representing typical data, Snapshot, and Replica. The path 359 stores a path of a storage location where the data unit corresponding to the entry is stored.

Next, an application deployment process S100 will be described. The application deployment process S100 is executed, for example, when the host 150 receives, from the user, a request for generating an arrangement plan (container-data arrangement plan) of containers that execute applications and data stores that store data of the applications.

Figure 20:
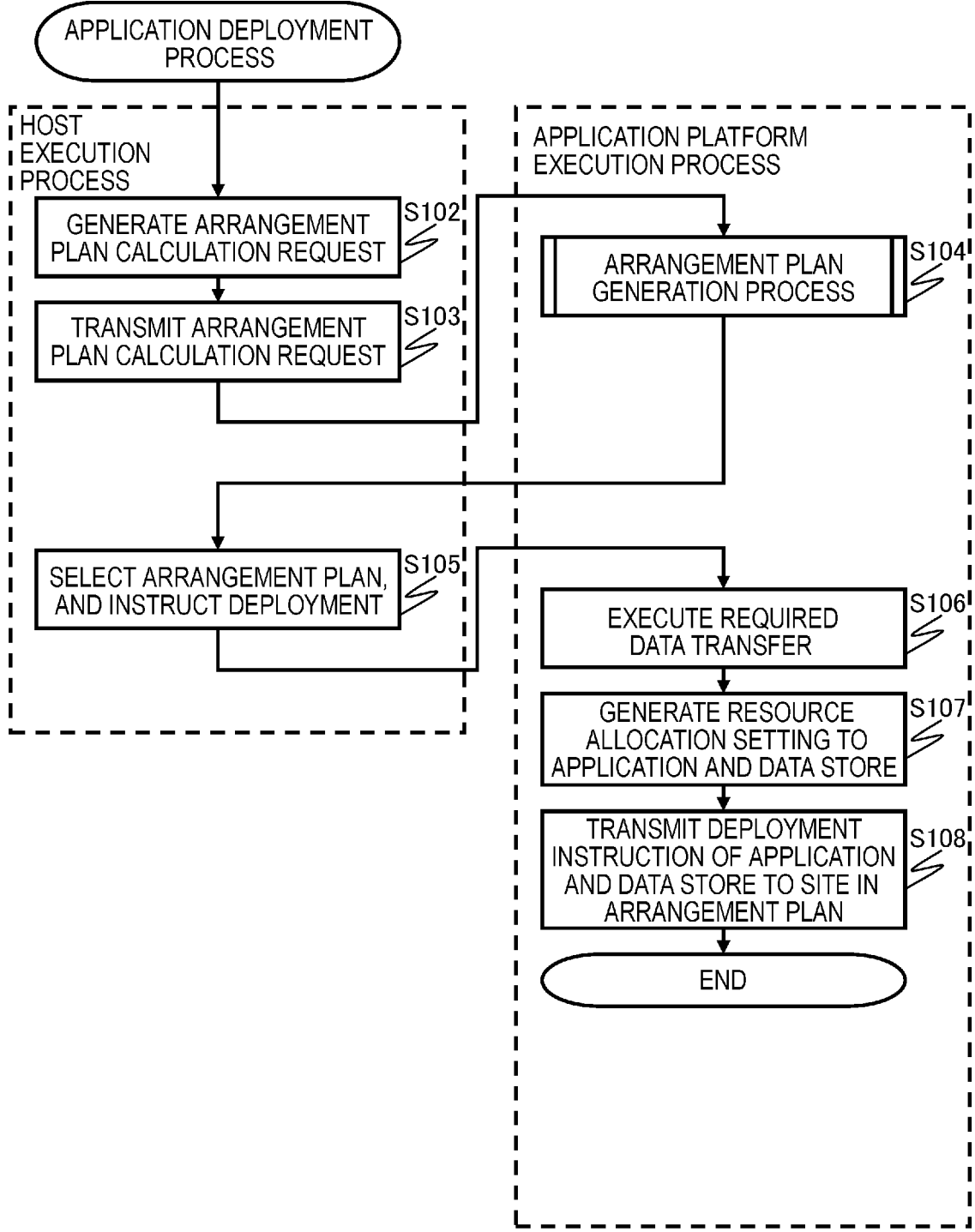
FIG. 20 is a flowchart illustrating an application deployment process according to the first embodiment.

FIG. 20 is a flowchart illustrating the application deployment process according to the first embodiment.

For example, when the request for generating the container-data arrangement plan is received from the user through an arrangement plan calculation request screen 1400 (refer to FIG. 21), the client process program 161 of the host 150 generates an arrangement plan generation request for the application platform 100 in response to the generation request (Step S102), and transmits the generated arrangement plan generation request to the application platform 100 (Step S103).

When the arrangement plan generation request is received from the host 150, the inter-site arrangement optimization program 111 of the application platform 100 executes an arrangement plan generation process S200 of generating an arrangement plan corresponding to the arrangement plan generation request, and transmits the generated arrangement plan to the host 150 (Step S104).

The client process program 161 of the host 150 receives the arrangement plan transmitted from the application platform 100 and displays the arrangement plan. Here, the displayed arrangement plan may include, for example, a site ID of the site system 200 that deploys a container executing an application and a data store managing data of the application, a resource amount of hardware allocated to the container, a resource amount of hardware allocated to the data store, and a value of KPI that can be implemented. Next, the client process program 161 receives selection of an arrangement plan to be applied from the user, and instructs the application platform 100 to execute the deployment in accordance with the arrangement plan (Step S105). When the arrangement plan has a problem, the process may restart from Step S102 in response to an instruction of the user.

In accordance with the instructed arrangement plan, the inter-site arrangement optimization program 111 of the application platform 100 transmits a transfer instruction of data required to execute the application to the site system 200 that stores the data (Step S106). As a result, in response to the instruction, the inter-site data control program 213 of the site system 200 transfers the data required to execute the application to the site system 200 in accordance with the arrangement plan.

Next, in accordance with the arrangement plan, the application platform 100 generates a setting (resource allocation setting) for allocating the resources to the container executing the application and the data store (Step S107), and transmits an instruction (deployment instruction) to deploy the container and the data store corresponding to the resource allocation setting to the site systems 200 of the sites in the arrangement plan (Step S108). As a result, the deployment control program 211 of the site system 200 that receives the instruction deploys the container of the application and the data store in accordance with the resource allocation setting.

Next, an arrangement plan calculation request screen 1400 will be described.

FIG. 21 is a diagram illustrating one example of the arrangement plan calculation request screen according to the first embodiment.

The arrangement plan calculation request screen 1400 is displayed, for example, by the client process program 161 of the host 150. The arrangement plan calculation request screen 1400 includes an application selection field 1410, a target data designation field 1420, a KPI designation field 1430, and a transmission button 1440.

The application selection field 1410 displays the applications registered in the application management table 800 such that at least one application can be selected from the applications. The user selects the application to be used in the application selection field 1410.

The target data designation field 1420 displays a selection field 1421 for selecting target data as a target to be used by the application and an addition button 1422. The selection field 1421 may display, for example, information (for example, a data ID; when data is a snapshot, a date and time, a size, and the like) regarding data in the search result obtained by executing the search request. The addition button 1422 is a button for receiving an instruction to add new data to the selection field 1421. When the addition button 1422 is pressed, a screen or the like for designating data to be added to the selection field 1421 is displayed.

The KPI designation field 1430 includes a restriction selection field 1431, a restriction lower limit designation field 1432, a priority designation field 1433, an allowable relaxation width designation field 1434, a restriction addition button 1435, and an optimization method designation field 1436. A set including the restriction selection field 1431, the restriction lower limit designation field 1432, the priority designation field 1433, and the allowable relaxation width designation field 1434 is provided for each restriction that is designated as KPI.

The restriction selection field 1431 displays types of KPI to be restricted such that one type can be selected from the types. Examples of the types of KPI to be restricted include an execution time, a cost, a power amount, a throughput, and a response time. To the restriction lower limit designation field 1432, the user can input the desired loosest restriction value (an example of the target performance information and lower limit information) of the KPI to be restricted. For example, when the KPI is the execution time, an upper limit value of the execution time can be input to the restriction lower limit designation field 1432. The priority designation field 1433 displays a priority in a plurality of KPIs to be restricted such that the priority can be selected. When a plurality of restrictions of KPI are present, a KPI to be relaxed is determined in accordance with this priority. To the allowable relaxation width designation field 1434, a width (an example of relaxation range information) that can be allowed for the restriction when an arrangement plan that satisfies the lower limit of KPI to be restricted is not present can be input.

The restriction addition button 1435 is a button for adding a type of restriction. When the restriction addition button 1435 is pressed, the restriction selection field 1431, the restriction lower limit designation field 1432, the priority designation field 1433, and the allowable relaxation width designation field 1434 are displayed to designate a new restriction. In the example of the arrangement plan calculation request screen 1400 of FIG. 21, only the restriction 1 is displayed. When the restriction addition button 1435 is pressed once, the restriction selection field 1431, the restriction lower limit designation field 1432, the priority designation field 1433, and the allowable relaxation width designation field 1434 are displayed to designate a restriction 2.

The optimization method designation field 1436 displays a method (optimization method) of determining the optimal arrangement plan among arrangement plans that satisfy the restriction such that the method can be selected.

The transmission button 1440 is a button for receiving an instruction to calculate the arrangement plan with the contents designated by the application selection field 1410, the target data designation field 1420, and the KPI designation field 1430. When the transmission button 1440 is pressed, the host 150 transmits the arrangement plan generation request including the contents designated by the application selection field 1410, the target data designation field 1420, and the KPI designation field 1430 to the application platform 100.

Next, the arrangement plan generation process S200 will be described.

Figure 22:
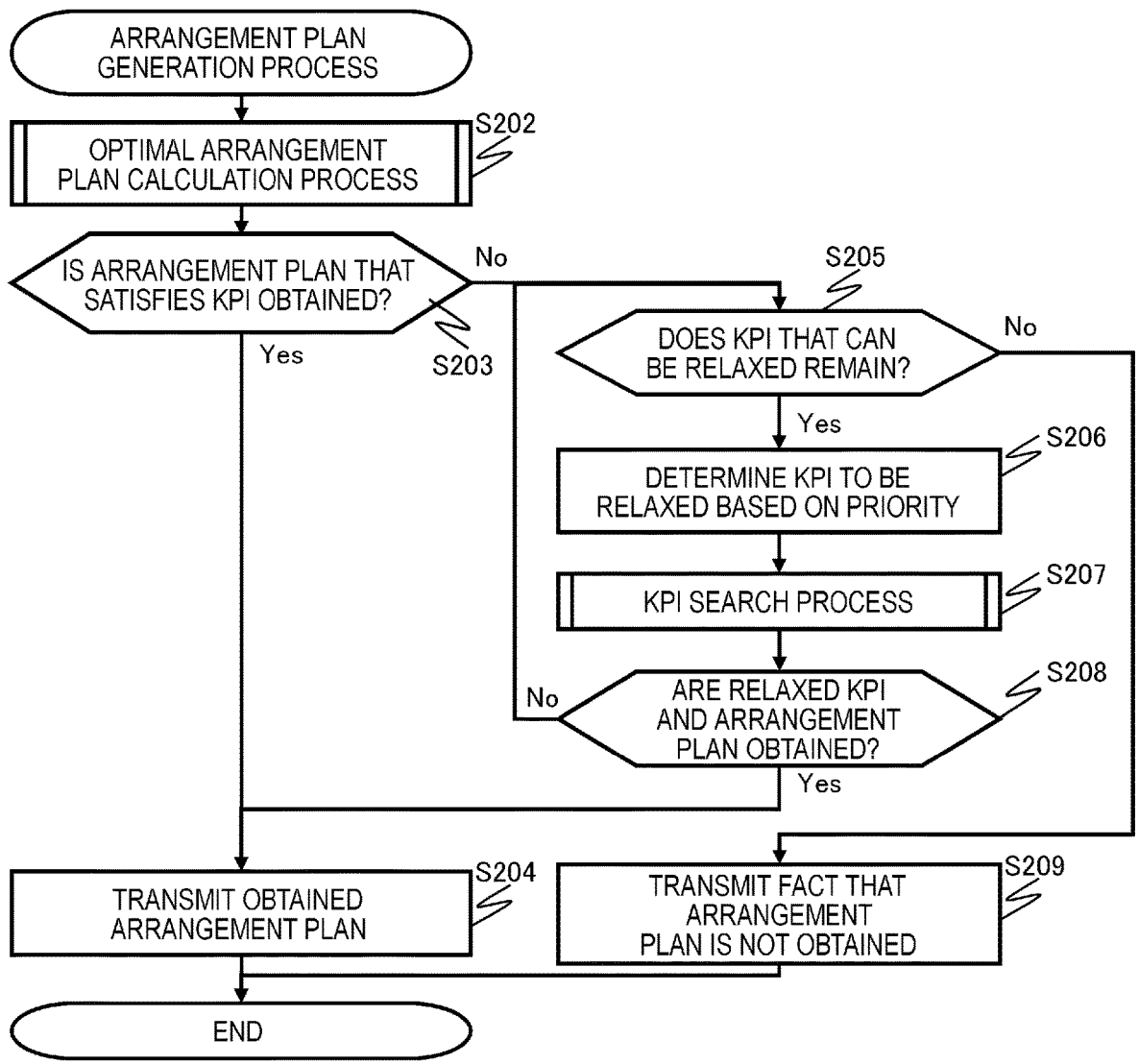
FIG. 22 is a flowchart illustrating an arrangement plan generation process according to the first embodiment.

FIG. 22 is a flowchart illustrating the arrangement plan generation process according to the first embodiment. The arrangement plan generation process of FIG. 22 illustrates an example where the upper limit of the processing time is set as the restriction of the KPI and cost minimization is set as the optimization method.

The inter-site arrangement optimization program 111 of the application platform 100 (to be exact, the CPU 102 that executes the inter-site arrangement optimization program 111) executes an optimal arrangement plan calculation process S300 (refer to FIG. 23) of calculating the optimal arrangement plan (Step S202).

Next, the inter-site arrangement optimization program 111 determines whether or not an arrangement plan that satisfies the restriction of KPI (the lower limit of KPI) in the arrangement plan generation request is obtained through the optimal arrangement plan calculation process (Step S203).

As a result, when the inter-site arrangement optimization program 111 determines that the arrangement plan that satisfies the restriction of KPI is obtained (Step S203: Yes), the inter-site arrangement optimization program 111 transmits the obtained arrangement plan to the host 150 in response to the determination (Step S204), and ends the arrangement plan generation process.

On the other hand, when the inter-site arrangement optimization program 111 determines that the arrangement plan that satisfies the restriction of KPI is not obtained (Step S203: No), the inter-site arrangement optimization program 111 determines whether or not the KPI that can be relaxed based on the arrangement plan generation request remains (Step S205).

As a result, when the inter-site arrangement optimization program 111 determines that the KPI that can be relaxed remains (Step S205: Yes), the inter-site arrangement optimization program 111 determines the KPI to be relaxed based on the priority for the restrictions of KPIs in the arrangement plan generation request (Step S206).

Next, the inter-site arrangement optimization program 111 executes a KPI search process S500 (refer to FIG. 28) of searching for the value of KPI capable of implementing an arrangement plan in the relaxation range designated by the arrangement plan generation request for the determined KPI to be relaxed and searching for the arrangement plan (Step S207).

Next, the inter-site arrangement optimization program 111 determines whether or not the KPI relaxed by the KPI search process S500 and the arrangement plan capable of implementing the KPI are obtained (Step S208). When the inter-site arrangement optimization program 111 determines that the relaxed KPI and the arrangement plan capable of implementing the KPI are obtained (Step S208: Yes), the inter-site arrangement optimization program 111 proceeds the process to Step S204. When the inter-site arrangement optimization program 111 determines that the relaxed KPI and the arrangement plan capable of implementing the KPI are not obtained (Step S208: No), the inter-site arrangement optimization program 111 proceeds the process to Step S205.

On the other hand, when the inter-site arrangement optimization program 111 determines that the KPI that can be relaxed does not remain (Step S205: No) in Step S205, the inter-site arrangement optimization program 111 transmits the fact that the arrangement plan is not obtained to the host 150 in response to the determination (Step S209), and ends the arrangement plan generation process.

Next, the optimal arrangement plan calculation process S300 will be described.

Figure 23:
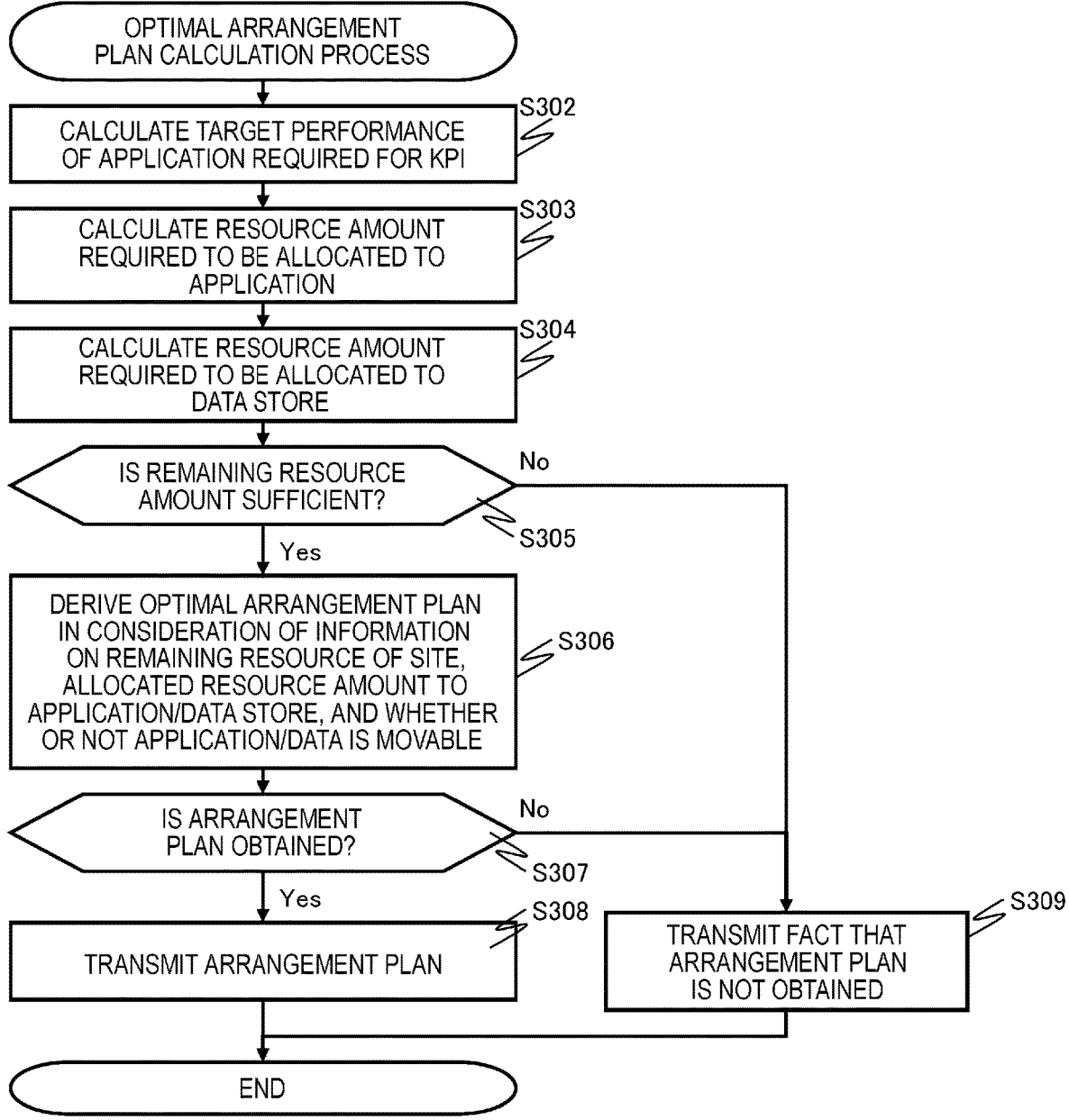
FIG. 23 is a flowchart illustrating an optimal arrangement plan calculation process according to the first embodiment.

FIG. 23 is a flowchart illustrating the optimal arrangement plan calculation process according to the first embodiment.

The inter-site arrangement optimization program 111 of the application platform 100 (to be exact, the CPU 102 that executes the inter-site arrangement optimization program 111) calculates target performance of the application required for the restriction of KPI (the lower limit of KPI) in the arrangement plan generation request (Step S302). A specific example of a method of calculating the target performance of the application will be described below.

Next, the inter-site arrangement optimization program 111 calculates a resource amount (an example of the application allocated resource amount) of one or more resources required to be allocated to the application (the container that executes the application) for achieving the target performance of the application (Step S303). A specific example of a method (application allocated resource calculation method 1700) of calculating the resource amount required to be allocated to the application will be described below.

Next, the inter-site arrangement optimization program 111 calculates a resource amount (an example of the data store allocated resource amount) required to be allocated to the data store to achieve the target performance of the application (Step S304). A specific example of a method (data store allocated resource calculation method 1800) of calculating the resource amount required to be allocated to the data store will be described below.

Next, the inter-site arrangement optimization program 111 determines whether or not a remaining resource amount in each of the site systems 200 is sufficient with respect to the calculated resource amounts allocated to the application and the data store (Step S305). For this determination, a specific arrangement plan does not need to be considered, and whether or not another condition where it can be relatively easily determined that the arrangement plan cannot be generated, for example, a condition where domestic movement or abroad movement of data cannot be executed is satisfied may be determined.

As a result, when the inter-site arrangement optimization program 111 determines that the remaining resource amount in each of the site systems 200 is sufficient with respect to the calculated resource amounts allocated to the application and the data store (Step S305: Yes), the inter-site arrangement optimization program 111 derives an arrangement plan (preferably, the optimal arrangement plan) based on the remaining resource of each of the site systems 200, the resource amounts allocated to the application and the data store, the information regarding whether or not the application/data are movable, and the like (Step S306). As a method of deriving the optimal arrangement plan, a solver of mathematical programming may be used, or a model of machine learning may be used.

Next, the inter-site arrangement optimization program 111 determines whether or not the arrangement plan that satisfies the request is obtained (Step S307). As a result, when the arrangement plan is obtained (Step S307: Yes), the inter-site arrangement optimization program 111 transmits the obtained arrangement plan to the caller of the process (Step S308) and ends the optimal arrangement plan calculation process.

On the other hand, when the inter-site arrangement optimization program 111 determines that the remaining resource amount in each of the site systems 200 is not sufficient with respect to the calculated resource amounts allocated to the application and the data store (Step S305: No) or when the arrangement plan is not obtained (Step S307: No), the inter-site arrangement optimization program 111 transmits the fact that the arrangement plan is not obtained to the caller of the process (Step S309) and ends the optimal arrangement plan calculation process.

Next, the application allocated resource calculation method 1700 will be described.

Figure 24:
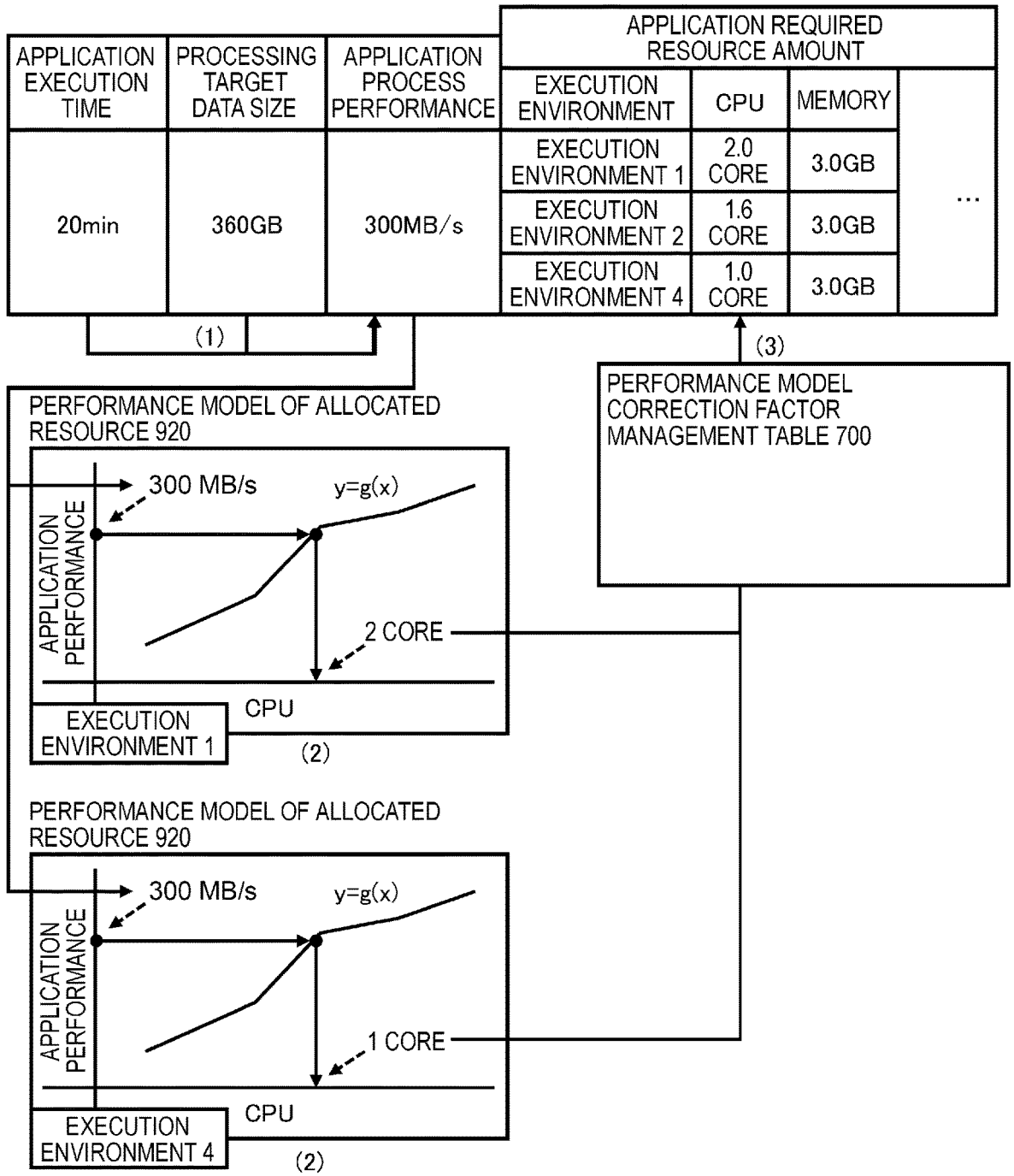
FIG. 24 is a diagram illustrating a specific example of an application allocated resource calculation method according to the first embodiment.

FIG. 24 is a diagram illustrating the specific example of an application allocated resource calculation method according to the first embodiment. FIG. 24 illustrates an example of calculating the resource amount (number of cores) of the CPU as an example of the resource. However, for other resources, the resource amount can be calculated through the same process.

The inter-site arrangement optimization program 111 calculates processing performance (target performance) of the application that satisfies the lower limit of KPI based on the application execution time received as the lower limit of KPI and the size of data as a processing target (corresponding to Step S302 of FIG. 23). In the example of FIG. 24, the inter-site arrangement optimization program 111 calculates application processing performance (300 MB/s) as the target performance by dividing the processing target data size (360 GB) by the application execution time (20 min) (FIG. 24 (1)).

Next, the inter-site arrangement optimization program 111 calculates a resource amount (allocated resource amount) to be allocated in each of the execution environments to implement the target performance of the application (FIG. 24 (2)). Here, for an execution environment having the application performance model, the inter-site arrangement optimization program 111 may calculate a resource amount in the execution environment required to implement the target performance of the application using the application performance model. In addition, for an execution environment (in the example of FIG. 24, Execution Environment 2) for which the correction factor with respect to an execution environment (in the example of FIG. 24, Execution Environment 1) for which the allocated resource amount is calculated is managed in the performance model correction factor management table 700, the inter-site arrangement optimization program 111 may calculate an allocated resource amount of one execution environment with respect to the allocated resource amount calculated for another execution environment (for example, Execution Environment 1) using the correction factor (or the margin) between the execution environments in the performance model correction factor management table 700 (FIG. 24 (3)).

Next, the data store allocated resource calculation method 1800 will be described.

Figure 25:
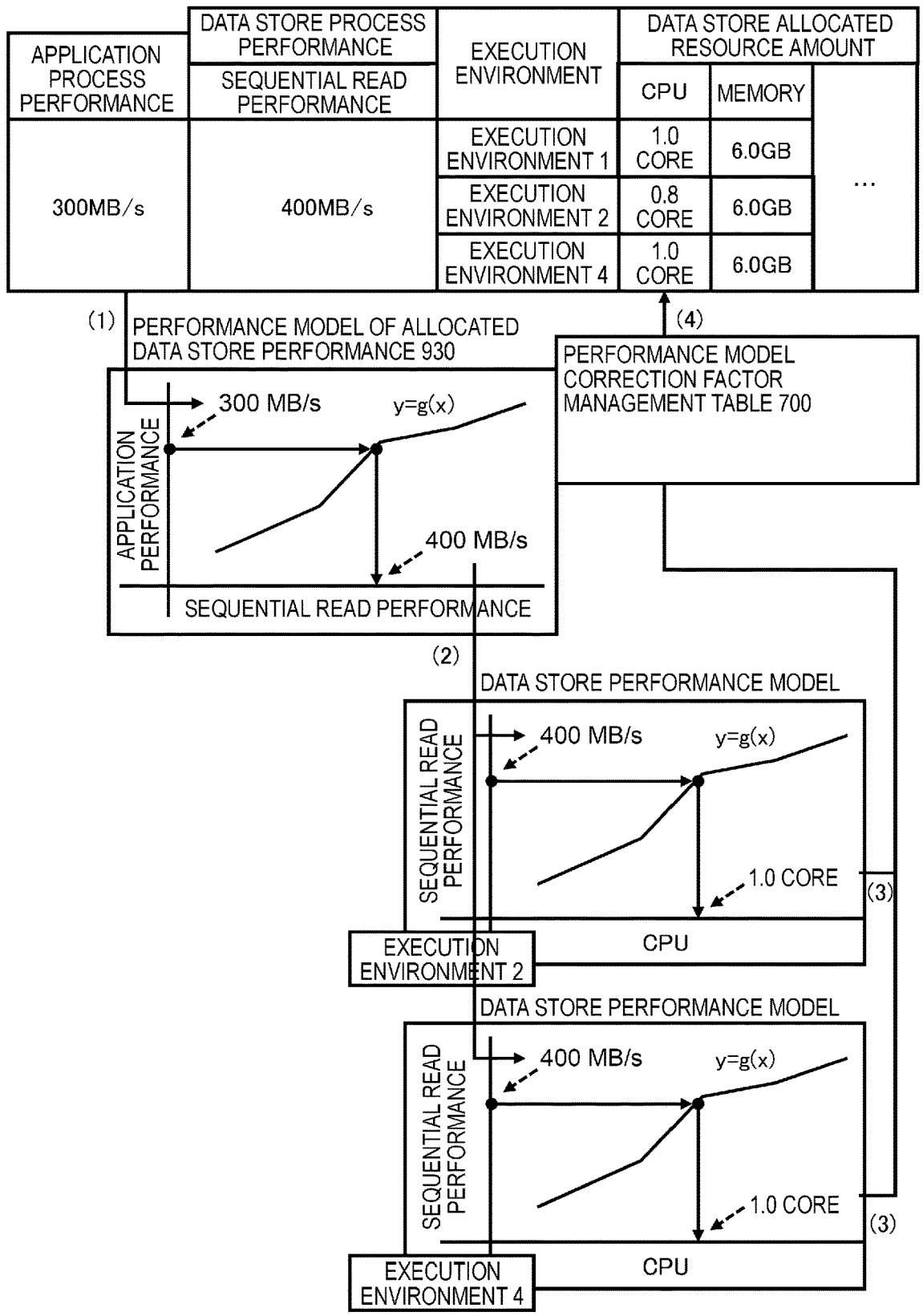
FIG. 25 is a diagram illustrating a specific example of a data store allocated resource calculation method according to the first embodiment.

FIG. 25 is a diagram illustrating the specific example of the data store allocated resource calculation method according to the first embodiment.

The inter-site arrangement optimization program 111 inputs the target performance of the application (FIG. 25 (1)) and calculates performance (in the example of FIG. 25, performance of sequential read) of the data store required to implement the target performance (FIG. 25 (2)). Specifically, the inter-site arrangement optimization program 111 calculates performance (required performance) of the data store required to implement the target performance of the application using the performance model of the allocated data store performance 930 in the application performance model management table 900.

Next, the inter-site arrangement optimization program 111 calculates a resource amount (allocated resource amount) to be allocated in each of the execution environments to implement the required performance of the data store (FIG. 25 (3)). Here, for an execution environment having the data store performance model, the inter-site arrangement optimization program 111 may calculate a resource amount in the execution environment required to implement the target performance of the data store using the data store performance model. In addition, for an execution environment (in the example of FIG. 25, Execution Environment 2) for which the correction factor with respect to an execution environment (in the example of FIG. 25, Execution Environment 1) for which the allocated resource amount is calculated is managed in the performance model correction factor management table 700, the inter-site arrangement optimization program 111 may calculate an allocated resource amount of one execution environment with respect to the allocated resource amount calculated for another execution environment using the correction factor (or the margin) between the execution environments in the performance model correction factor management table 700 (FIG. 25 (4)).

Next, a KPI search process S400 will be described.

Figure 26:
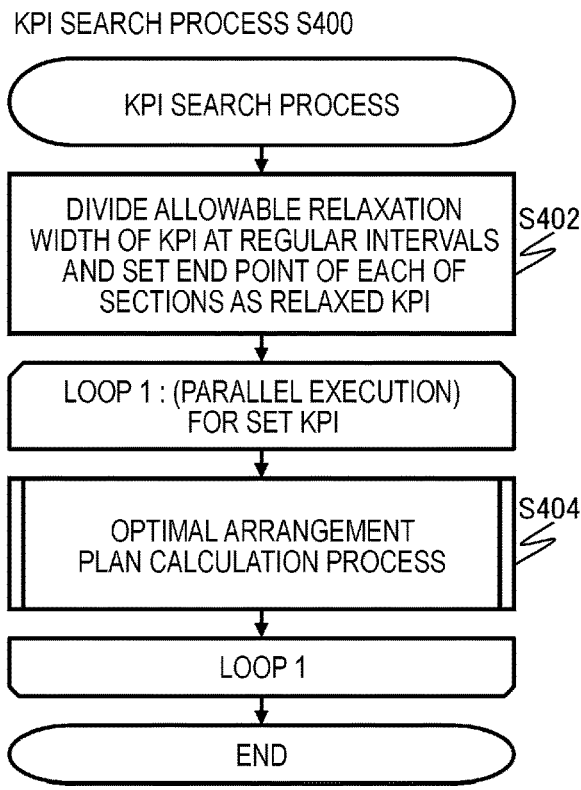
FIG. 26 is a flowchart illustrating a KPI search process according to the first embodiment.

FIG. 26 is a flowchart illustrating the KPI search process according to the first embodiment.

The inter-site arrangement optimization program 111 divides the allowable relaxation width range with respect to the lower limit of KPI into a plurality of sections (for example, at regular intervals) and sets an end point of each of the divided sections as the relaxed KPI (relaxed KPI) (Step S402).

Next, the inter-site arrangement optimization program 111 executes a process (Step S404) of a loop 1 on each of the set relaxed KPIs. In the embodiment, the process of the loop 1 is executed on the relaxed KPIs in parallel, but may not be executed in parallel. By executing the process of the loop 1 in parallel, an arrangement plan that satisfies each of the relaxed KPIs can be calculated at an early stage and can be presented to the user at an early stage.

In the process of the loop 1, the inter-site arrangement optimization program 111 executes the optimal arrangement plan calculation process S300 of calculating the arrangement plan for implementing a relaxed KPI for the target relaxed KPI (Step S404).

Next, the inter-site arrangement optimization program 111 ends the KPI search process after executing the process of the loop 1 on all of the relaxed KPIs.

Next, a specific example of a method of determining a KPI of an arrangement plan calculation target will be described.

Figure 27:
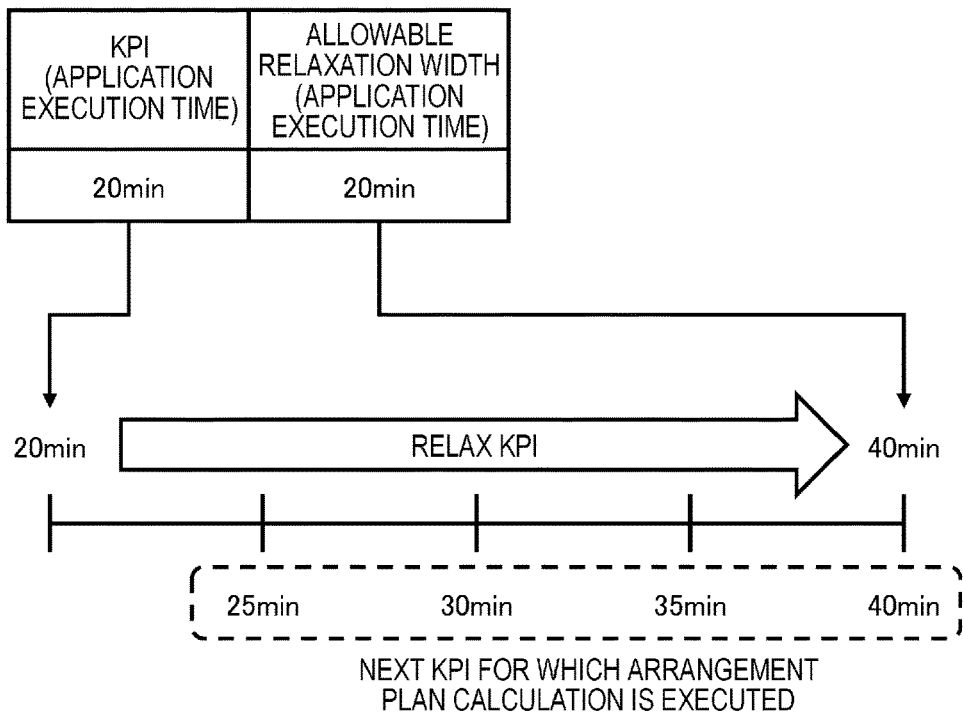
FIG. 27 is a diagram illustrating a specific example of a method of determining a KPI of an arrangement plan calculation target according to the first embodiment.

FIG. 27 is a diagram illustrating the specific example of the method of determining the KPI of the arrangement plan calculation target according to the first embodiment.

In the example of FIG. 27, the upper limit of the application execution time as the lower limit of KPI is designated to 20 min, and the allowable relaxation width for the application execution time is designated to 20 min.

In this case, a range obtained by adding an allowable relaxation width of 20 min to 20 min as the upper limit of the application execution time, that is, a range of 20 to 40 min is set as a range of the relaxed KPIs. Here, the inter-site arrangement optimization program 111 divides 20 to 40 min into a plurality of sections at regular intervals (for example, 5 min) and sets each of 25, 30, 35, and 40 min that are end points of the divided sections as the relaxed KPI.

Next, a computer system according to a second embodiment will be described. The computer system according to the second embodiment is different from the computer system according to the first embodiment in the function of the inter-site arrangement optimization program 111, and the difference in the function of the inter-site arrangement optimization program 111 will be mainly described. Regarding reference numerals to be used, the description will be made using the reference numerals used in the computer system 1 according to the first embodiment for convenience of description.

The inter-site arrangement optimization program 111 of the computer system according to the second embodiment executes the KPI search process S500 (refer to FIG. 28) instead of the KPI search process S400.

Figure 28:
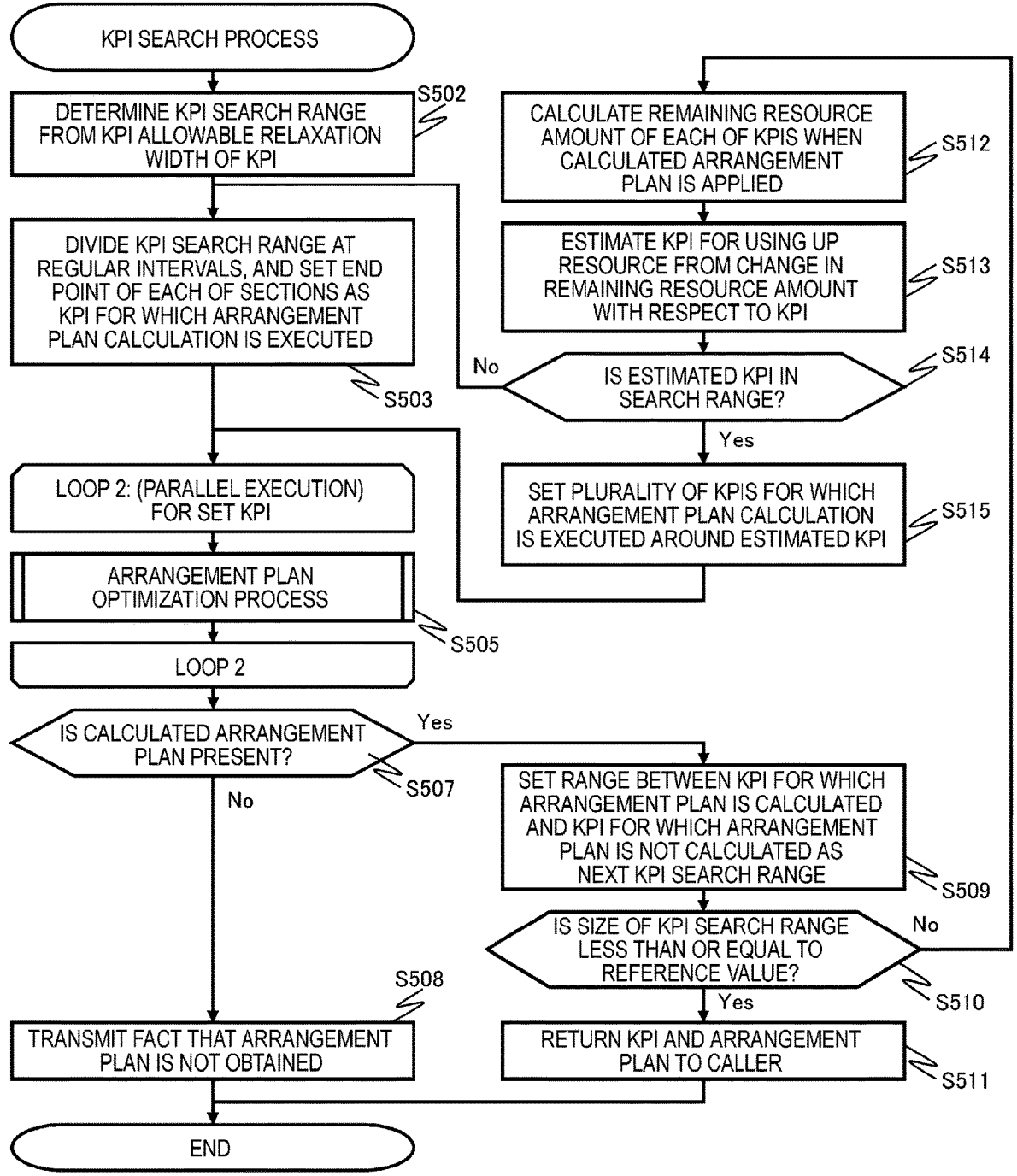
FIG. 28 is a flowchart illustrating a KPI search process according to a second embodiment.

FIG. 28 is a flowchart illustrating the KPI search process according to the second embodiment.

The inter-site arrangement optimization program 111 determines a search range for searching for a higher KPI for which an arrangement plan can be calculated from the range of the allowable relaxation width with respect to the lower limit of KPI (Step S502).

Next, the inter-site arrangement optimization program 111 divides the determined search range into a plurality of sections (for example, at regular intervals) and sets an end point of each of the divided sections as a KPI (target KPI) for which the arrangement plan calculation is executed (Step S503).

Next, the inter-site arrangement optimization program 111 executes a process (Step S505) of a loop 2 on each of the set target KPIs. In the embodiment, the process of the loop 2 is executed on the target KPIs in parallel, but may not be executed in parallel.

In the process of the loop 2, the inter-site arrangement optimization program 111 executes the optimal arrangement plan calculation process S300 of calculating the arrangement plan for implementing a target KPI for the target KPI (Step S505).

Next, the inter-site arrangement optimization program 111 determines whether or not the calculated arrangement plan is present (Step S507). When the calculated arrangement plan is not present (Step S507: No), the KPI for which the arrangement plan can be calculated is not present in the allowable relaxation width, the inter-site arrangement optimization program 111 transmits the fact that the arrangement plan is not obtained to the caller of the process (Step S508) and ends the KPI search process.

On the other hand, when the calculated arrangement plan is present (Step S507: Yes), the inter-site arrangement optimization program 111 sets a range between a KPI for which the arrangement plan is not calculated and the highest KPI for which the arrangement plan is calculated as the next search range (Step S509).

Next, the inter-site arrangement optimization program 111 determines whether or not the size of the search range is less than or equal to a predetermined reference value (Step S510).

As a result, when the size of the search range is less than or equal to the reference value (Step S510: Yes), the inter-site arrangement optimization program 111 returns the calculated KPI and arrangement plan to the caller of the process (Step S511) and ends the KPI search process.

On the other hand, when the size of the search range is not less than or equal to the reference value (Step S510: No), the inter-site arrangement optimization program 111 calculates a remaining resource amount of each of the sites when the calculated arrangement plan is applied to each of the KPIs for which the arrangement plan is calculated (Step S512).

Next, the inter-site arrangement optimization program 111 estimates a KPI for using up the resource from a change in the remaining resource amount with respect to the KPI (Step S513).

Next, the inter-site arrangement optimization program 111 determines whether or not the estimated KPI is in the search range (Step S514). As a result, when the estimated KPI is not in the search range (Step S514: NO), the inter-site arrangement optimization program 111 proceeds the process to Step S503.

On the other hand, when the estimated KPI is in the search range (Step S514: Yes), the inter-site arrangement optimization program 111 sets a plurality of KPIs for which the arrangement plan calculation is executed around the estimated KPI (Step S515), and executes the process of the loop 2 on each of the set target KPIs. By executing the process of the loop 2, a higher KPI for which the arrangement plan can be calculated is identifiable.

In the KPI search process, a higher KPI for which the arrangement plan can be calculated is identified until the KPI search range is less than or equal to the reference value, and an arrangement plan for the KPI can be calculated.

A specific example of a method of estimating the KPI for using up the remaining resource in Step S512 and Step S513 will be described.

Figure 29:
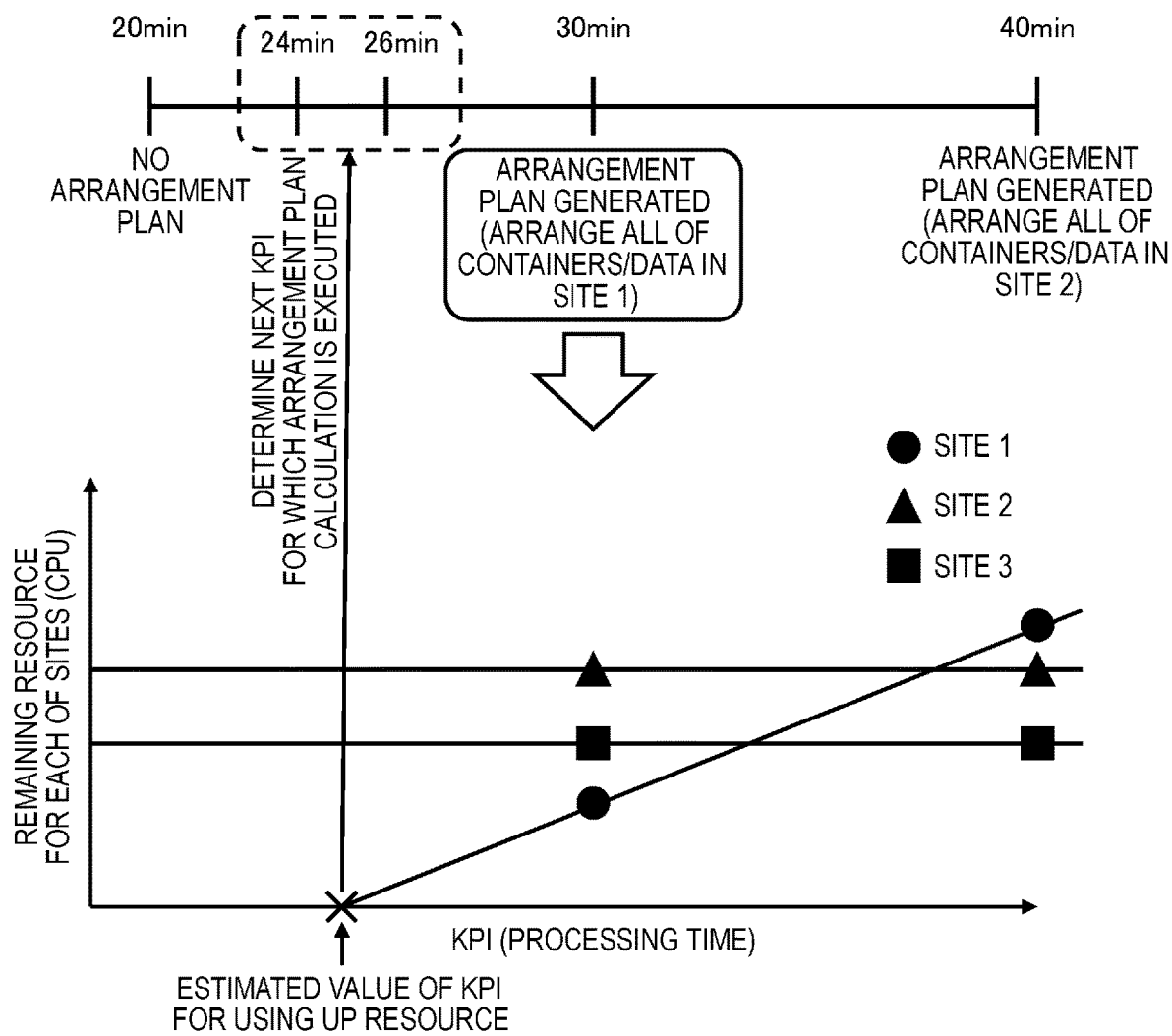
FIG. 29 is a diagram illustrating a specific example of a method of estimating a KPI for using up a remaining resource according to the second embodiment.

FIG. 29 is a diagram illustrating the specific example of the method of estimating the KPI for using up the remaining resource according to the second embodiment.

First, the inter-site arrangement optimization program 111 calculates a remaining resource amount of each of the sites when the calculated arrangement plan is applied to each of the KPIs (in FIG. 29, the execution time) for which the arrangement plan is calculated in Step S512. In the example of FIG. 29, when the execution time is 30 min and when the execution time is 40 min, arrangement plans are present, and the remaining resource amount in the site system 200 when each of the arrangement plans is applied is illustrated.

The inter-site arrangement optimization program 111 estimates a KPI for using up the remaining resource, that is, the highest KPI for which the arrangement plan is most likely to be searched based on a change in execution time. For example, in FIG. 29, when the processing time changes from 40 min to 30 min, the remaining resource of the site 1 decreases. Therefore, the execution time is estimated based on the decrease rate in the remaining resource from the viewpoint of using up the remaining resource of the site 1.

This way, when the KPI for using up the remaining resource illustrated in FIG. 29 is estimated, the inter-site arrangement optimization program 111 sets a plurality of KPIs for which the arrangement plan calculation is executed around the estimated KPI in Step S515.

FIG. 29 illustrates an example where the CPU imposes a bottleneck on the performance. When other resources impose a bottleneck on the performance, the same process may be executed for the resources. For example, when the cost is designated as the KPI, the remaining resource amount may be a remaining cost.

In the method of estimating the KPI for using up the remaining resource, a higher KPI (more similar to the lower limit of the designated KPI) that can satisfy the arrangement plan can be searched.

Next, a computer system according to a third embodiment will be described. The computer system according to the third embodiment is different from the computer system according to the first embodiment in the function of the inter-site arrangement optimization program 111, and the difference in the function of the inter-site arrangement optimization program 111 will be mainly described. Regarding reference numerals to be used, the description will be made using the reference numerals used in the computer system 1 according to the first embodiment for convenience of description.

The inter-site arrangement optimization program 111 of the computer system according to the third embodiment executes an arrangement plan generation process 51000 (refer to FIG. 30) instead of the arrangement plan generation process S200.

Figure 30:
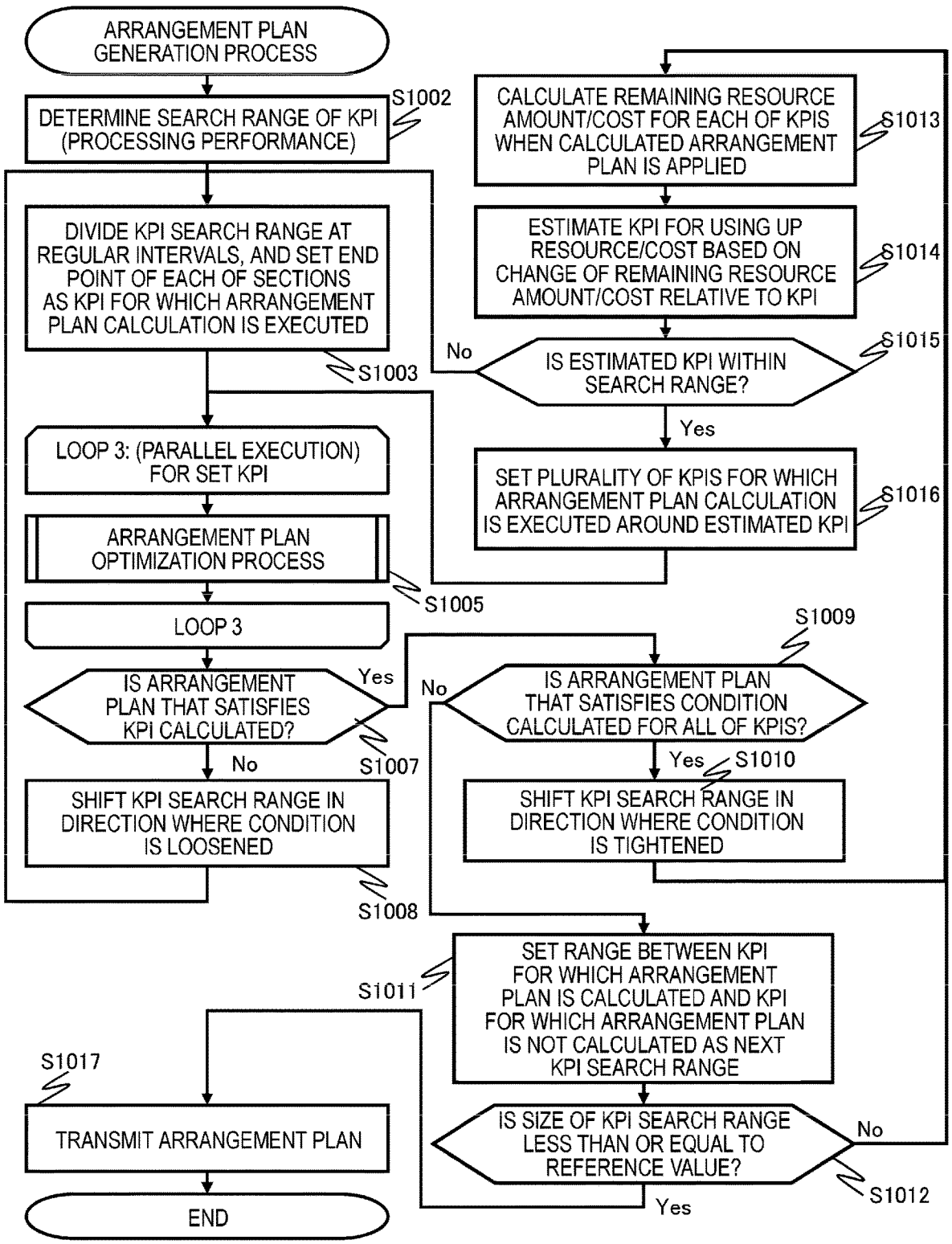
FIG. 30 is a flowchart illustrating an arrangement plan generation process according to a third embodiment.

FIG. 30 is a flowchart illustrating the arrangement plan generation process according to the third embodiment. The arrangement plan generation process of FIG. 30 illustrates an example where the upper limit of the cost is set as the restriction regarding the KPI and processing performance maximization is set as the optimization method. Here, the cost changes depending on the arrangement of the containers. Therefore, the allocated resource amount cannot be uniquely determined with respect to a specific cost. By checking a change in cost when the performance of the application is changed, an arrangement plan for using up the cost and maximizing the processing performance is searched.

The inter-site arrangement optimization program 111 determines a search range where the KPI is searched with respect to the processing performance for which the arrangement plan can be calculated (Step S1002). The search range may be determined based on a KPI corresponding to, for example, performance of the upper limit when the performance model is generated or average performance that is figured out based on a log in the actual arrangement.

Next, the inter-site arrangement optimization program 111 divides the determined search range into a plurality of sections (for example, at regular intervals) and sets an end point of each of the divided sections as a KPI (target KPI) for which the arrangement plan calculation is executed (Step S1003).

Next, the inter-site arrangement optimization program 111 executes a process (Step S1005) of a loop 3 on each of the set target KPIs. In the embodiment, the process of the loop 3 is executed on the target KPIs in parallel, but may not be executed in parallel.

In the process of the loop 3, the inter-site arrangement optimization program 111 executes the optimal arrangement plan calculation process S300 of calculating the arrangement plan for implementing a target KPI for the target KPI (Step S1005).

Next, the inter-site arrangement optimization program 111 determines whether or not an arrangement plan that satisfies the target KPI is calculated (Step S1007). When the inter-site arrangement optimization program 111 determines that the arrangement plan is not calculated (Step S1007: No), the inter-site arrangement optimization program 111 shifts the search range in a direction in which the condition of the KPI is loosened so as not to overlap the current search range (Step S1008), and proceeds the process to Step S1003. As a result, the arrangement plan is calculated for the KPI under the looser condition.

On the other hand, when the inter-site arrangement optimization program 111 determines that the arrangement plan is calculated (Step S1007: Yes), the inter-site arrangement optimization program 111 determines whether or not the arrangement plan is calculated for all of the target KPIs (Step S1009).

As a result, when the inter-site arrangement optimization program 111 determines that the arrangement plan is calculated for all of the target KPIs (Step S1009: Yes), the inter-site arrangement optimization program 111 shifts the search range in a direction in which the condition of the KPI is tightened so as not to overlap the current search range (Step S1010), and proceeds the process to Step S1013.

On the other hand, when the inter-site arrangement optimization program 111 determines that the arrangement plan is not calculated for all of the target KPIs (Step S1009: No), the inter-site arrangement optimization program 111 sets a range between the target KPI for which the arrangement plan is calculated and the target KPI for which the arrangement plan is not calculated as the next KPI search range (Step S1011).

Next, the inter-site arrangement optimization program 111 determines whether or not the size of the search range is less than or equal to a predetermined reference value (Step S1012).

As a result, when the size of the search range is less than or equal to the reference value (Step S1012: Yes), the inter-site arrangement optimization program 111 returns the calculated KPI and arrangement plan to the caller of the process (Step S1017) and ends the arrangement plan generation process.

On the other hand, when the size of the search range is not less than or equal to the reference value (Step S1012: No), the inter-site arrangement optimization program 111 proceeds the process to Step S1013.

In Step S1013, the inter-site arrangement optimization program 111 calculates a remaining resource amount and a cost of each of the sites when the calculated arrangement plan is applied to each of the KPIs for which the arrangement plan is calculated (Step S1013).

Next, the inter-site arrangement optimization program 111 estimates a KPI for using up the resource and the cost from a change in the remaining resource amount with respect to the KPI (Step S1014).

Next, the inter-site arrangement optimization program 111 determines whether or not the estimated KPI is in the search range (Step S1015). As a result, when the estimated KPI is not in the search range (Step S1015: NO), the inter-site arrangement optimization program 111 proceeds the process to Step S1003.

On the other hand, when the estimated KPI is in the search range (Step S1015: Yes), the inter-site arrangement optimization program 111 sets a plurality of KPIs for which the arrangement plan calculation is executed around the estimated KPI (Step S1016), and executes the process of the loop 3 on each of the set target KPIs. The processes of Steps S1013 to S1016 are the same as the processes illustrated in FIG. 29.

In the KPI search process, a higher KPI for which the arrangement plan can be calculated is identified until the KPI search range is less than or equal to the reference value, and an arrangement plan for the KPI can be calculated.

The present invention is not limited to the above-described embodiments and can be appropriately modified within a range not departing from the scope of the present invention.

For example, in the embodiments, the lower limit of the target performance is received as the target performance information, the input of the allowable relaxation range for the restriction is received when the arrangement plan that satisfies the lower limit is not present, and the arrangement plan that satisfies the allowable range is searched for when the arrangement plan that satisfies the lower limit of the target performance is not present. However, the present invention is not limited to this example. For example, target performance range information from which a range of target performance (target performance range: for example, the upper limit and the lower limit) is identifiable may be received as the target performance information, and the arrangement plan that satisfies the performance in the target performance range may be searched for. In this case, in the process of the embodiment, the term "the lower limit of the target performance" may be replaced with "the upper limit of the target performance range", and the terms "relaxation range" and "the allowable relaxation width" may be replaced with "target performance range". In addition, in this case, even when the arrangement plan corresponding to the upper limit of the target performance range is present, a KPI search process S207 (S400, S500) of searching for the arrangement plan in the target performance range may be executed.

In addition, in the embodiments, the configuration of the application platform 100 may be different from that of the site system. However, the present invention is not limited to this example. The function of the application platform 100 may be given to any of the site systems 200 or may be distributed in the plurality of site systems 200.

In addition, in the embodiments, by storing the application performance model corresponding to the type of at least one execution environment and the correction factor regarding the application performance model between the types of the execution environments, the correspondence between performance of an application in each of the site systems and performance of a resource capable of implementing the performance of the application or the correspondence between performance of an application and performance of a data store capable of implementing the performance of the application is identifiable. However, the present invention is not limited to this example. For example, the application performance model corresponding to each of the site systems may be stored.

In addition, in the embodiments, by storing the data store performance model corresponding to the type of at least one execution environment and the correction factor regarding the data store performance model between the types of the execution environments, the correspondence between performance of a data store in each of the site systems and performance of a resource capable of implementing the performance of the data store is identifiable. However, the present invention is not limited to this example. For example, the data store performance model corresponding to each of the site systems may be stored.

In addition, in the embodiments, the correction factor depending on a difference in execution environment is calculated by measurement by actually executing the sample applications. However, the present invention is not limited to this example. For example, the correction factor may be determined based on specifications such as the frequency ratio of the CPU between execution environments.

In addition, in the embodiments, when an application is deployed, a container that executes the application is deployed. However, the present invention is not limited to this example. A virtual machine (VM) that executes the application may be deployed, or a process that executes the application may be deployed.

In addition, in the embodiments, some or all of the processes that are executed by the CPU may be executed in a hardware circuit. In addition, in the embodiments, the program may be installed from a program source. The program source may be a program distribution server or a recording medium (for example, a portable recording medium).

What is claimed is:

1. An arrangement plan search device for searching for an arrangement plan of a plurality of microservices configuring a service that deals with data in a plurality of site systems, the arrangement plan search device comprising:
 a storage unit; and
 a processor connected to the storage unit, wherein
 the storage unit stores service resource amount performance information from which, in the plurality of site systems, a correspondence between performance of the service and information regarding resource amounts of hardware allocated to the plurality of microservices capable of implementing the performance of the service is identifiable,
 the processor
  receives target performance information from which target performance of the service is identifiable from a user,
  determines microservice allocated resource amounts for the plurality of site systems based on the service resource amount performance information, the microservice allocated resource amounts being resource amounts of hardware allocated to the plurality of microservices that are required to implement the performance of the service identified from the target performance information, and
  searches for an arrangement plan of the plurality of microservices in the plurality of site systems capable of implementing the microservice allocated resource amounts,
 the microservices include an application that executes a process using data and a data store that stores data used in the application,
 the service resource amount performance information includes
  application resource amount performance information from which, in the plurality of site systems, a correspondence between performance of the application and information regarding a resource amount of hardware capable of implementing the performance of the application is identifiable,
  application data store performance information from which, in the plurality of site systems, a correspondence between performance of the application and performance of the data store capable of implementing the performance of the application is identifiable, and
  data store resource amount performance information from which, in the plurality of site systems, a correspondence between performance of the data store and information regarding a resource amount of hardware capable of implementing the performance of the data store is identifiable, and
 the processor
  receives information from which target performance of the application is identifiable as the target performance information,
  determines an application allocated resource amount for the plurality of site systems based on the application resource amount performance information, the application allocated resource amount being a resource amount of hardware required to implement the performance of the application identified from the target performance information,
  determines required performance for the plurality of site systems based on the application data store performance information, the required performance being performance of the data store required to implement the performance of the application identified from the target performance information,
  determines a data store allocated resource amount for the plurality of site systems based on the data store resource amount performance information, the data store allocated resource amount being a resource amount of hardware required to implement the required performance, and
  searches for an arrangement plan of the application and the data store in the plurality of site systems capable of implementing the application allocated resource amount and the data store allocated resource amount.

2. The arrangement plan search device according to claim 1, wherein
 the storage unit stores types of execution environments of the plurality of site systems,
 the service resource amount performance information includes, for at least one of the types of the execution environments, information from which a correspondence between performance of the service and performance of the resource capable of implementing the performance of the service is identifiable and correction information, depending on the type of the execution environment, for the correspondence between performance of the service and performance of the resource capable of implementing the performance of the service, and
 the processor determines microservice allocated resource amounts for the plurality of site systems based on the service resource amount performance information including the correction information, the microservice allocated resource amounts being resource amounts of hardware allocated to the plurality of microservices that are required to implement the performance of the service identified from the target performance information.

3. The arrangement plan search device according to claim 1, wherein
 the target performance information includes target performance range information from which a target performance range of the application is identifiable, and
 the processor searches for an arrangement plan that satisfies performance of the target performance range identified from the target performance range information.

4. The arrangement plan search device according to claim 3, wherein
the processor searches for an arrangement plan that simultaneously satisfies a plurality of performances of the target performance range corresponding to the target performance range information.

5. The arrangement plan search device according to claim 4, wherein
the processor searches for an arrangement plan for achieving higher performance in the target performance range.

6. The arrangement plan search device according to claim 5, wherein
the processor
searches for arrangement plans for a plurality of performances in the target performance range corresponding to the target performance range information, and
searches for an arrangement plan for achieving higher performance in the target performance range by searching for an arrangement plan for performance between performance for which the arrangement plan is searched and performance for which the arrangement plan is not searched.

7. The arrangement plan search device according to claim 6, wherein
the processor
searches for arrangement plans for a plurality of performances in the target performance range corresponding to the target performance range information, and
searches for an arrangement plan for achieving higher performance in the target performance range by calculating a remaining resource amount when the arrangement plan for the performance for which the arrangement plan is searched is applied, estimating performance for which an arrangement plan is likely to be searched based on the remaining resource amount, and searching for arrangement plans for a plurality of performances around the estimated performance.

8. The arrangement plan search device according to claim 1, wherein
the storage unit stores types of execution environments of the plurality of site systems,
the application resource amount performance information includes, for at least one of the types of the execution environments, information from which a correspondence between performance of the application and performance of the resource capable of implementing the performance of the application is identifiable and first correction information, depending on the type of the execution environment, for the correspondence between performance of the application and performance of the resource capable of implementing the performance of the application,
the application data store performance information includes, for at least one of the types of the execution environments, information from which a correspondence between performance of the application and performance of the data store capable of implementing the performance of the application is identifiable and second correction information, depending on the type of the execution environment, for the correspondence between performance of the application and performance of the data store capable of implementing the performance of the application,
the data store resource amount performance information includes, for at least one of the types of the execution environments, information from which a correspondence between performance of the data store and information regarding a resource amount of hardware capable of implementing the performance of the data store is identifiable and third correction information, depending on the type of the execution environment, for the correspondence between performance of the data store and information regarding a resource amount of hardware capable of implementing the performance of the data store, and
the processor
determines an application allocated resource amount for the plurality of site systems based on the application resource amount performance information including the first correction information, the application allocated resource amount being a resource amount of hardware required to implement the performance of the application identified from the target performance information,
determines required performance for the plurality of site systems based on the application data store performance information including the second correction information, the required performance being performance of the data store required to implement the performance of the application identified from the target performance information, and
determines a data store allocated resource amount for the plurality of site systems based on the data store resource amount performance information including the third correction information, the data store allocated resource amount being a resource amount of hardware required to implement the required performance.

9. The arrangement plan search device according to claim 1, wherein
the processor presents the searched arrangement plan.

10. The arrangement plan search device according to claim 1, wherein
the processor arranges the plurality of microservices in accordance with the searched arrangement plan.

11. The arrangement plan search device according to claim 1, wherein
the processor
receives target cost information from which a target cost of the service is identifiable from a user,
sets the target performance information as the target performance information received from the user or predetermined target performance information,
determines microservice allocated resource amounts for the plurality of site systems based on the service resource amount performance information, the microservice allocated resource amounts being resource amounts of hardware allocated to the plurality of microservices that are required to implement the performance of the service identified from the target performance information, and
searches for an arrangement plan of the plurality of microservices in the plurality of site systems satisfying a target cost corresponding to the target cost information and capable of implementing the microservice allocated resource amounts.

12. A computer system comprising:
a plurality of site systems; and
an arrangement plan search device for searching for an arrangement plan of a plurality of microservices configuring a service that deals with data in the plurality of site systems, wherein
the arrangement plan search device includes a storage unit and a processor connected to the storage unit,
the storage unit stores service resource amount performance information from which, in the plurality of site systems, a correspondence between performance of the service and information regarding resource amounts of hardware allocated to the plurality of microservices capable of implementing the performance of the service is identifiable,
the processor
receives target performance information from which target performance of the service is identifiable from a user,
determines microservice allocated resource amounts for the plurality of site systems based on the service resource amount performance information, the microservice allocated resource amounts being resource amounts of hardware allocated to the plurality of microservices that are required to implement the performance of the service identified from the target performance information, and
searches for an arrangement plan of the plurality of microservices in the plurality of site systems capable of implementing the microservice allocated resource amounts,
the microservices include an application that executes a process using data and a data store that stores data used in the application,
the service resource amount performance information includes
application resource amount performance information from which, in the plurality of site systems, a correspondence between performance of the application and information regarding a resource amount of hardware capable of implementing the performance of the application is identifiable,
application data store performance information from which, in the plurality of site systems, a correspondence between performance of the application and performance of the data store capable of implementing the performance of the application is identifiable, and
data store resource amount performance information from which, in the plurality of site systems, a correspondence between performance of the data store and information regarding a resource amount of hardware capable of implementing the performance of the data store is identifiable, and
the processor
receives information from which target performance of the application is identifiable as the target performance information,
determines an application allocated resource amount for the plurality of site systems based on the application resource amount performance information, the application allocated resource amount being a resource amount of hardware required to implement the performance of the application identified from the target performance information,
determines required performance for the plurality of site systems based on the application data store performance information, the required performance being performance of the data store required to implement the performance of the application identified from the target performance information,
determines a data store allocated resource amount for the plurality of site systems based on the data store resource amount performance information, the data store allocated resource amount being a resource amount of hardware required to implement the required performance, and
searches for an arrangement plan of the application and the data store in the plurality of site systems capable of implementing the application allocated resource amount and the data store allocated resource amount.

13. An arrangement plan search method that is executed by an arrangement plan search device for searching for an arrangement plan of a plurality of microservices configuring a service that deals with data in a plurality of site systems, the arrangement plan search method comprising:
causing the arrangement plan search device to:
store service resource amount performance information from which, in the plurality of site systems, a correspondence between performance of the service and information regarding resource amounts of hardware allocated to the plurality of microservices capable of implementing the performance of the service is identifiable,
receive target performance information from which target performance of the service is identifiable from a user,
determine microservice allocated resource amounts for the plurality of site systems based on the service resource amount performance information, the microservice allocated resource amounts being resource amounts of hardware allocated to the plurality of microservices that are required to implement the performance of the service identified from the target performance information, and
search for an arrangement plan of the plurality of microservices in the plurality of site systems capable of implementing the microservice allocated resource amounts,
the microservices include an application that executes a process using data and a data store that stores data used in the application,
the service resource amount performance information includes
application resource amount performance information from which, in the plurality of site systems, a correspondence between performance of the application and information regarding a resource amount of hardware capable of implementing the performance of the application is identifiable,
application data store performance information from which, in the plurality of site systems, a correspondence between performance of the application and performance of the data store capable of implementing the performance of the application is identifiable, and
data store resource amount performance information from which, in the plurality of site systems, a correspondence between performance of the data store and information regarding a resource amount of hardware capable of implementing the performance of the data store is identifiable, and the method further comprising causing the arrangement plan search method to:
- receive information from which target performance of the application is identifiable as the target performance information,
- determine an application allocated resource amount for the plurality of site systems based on the application resource amount performance information, the application allocated resource amount being a resource amount of hardware required to implement the performance of the application identified from the target performance information,
- determine required performance for the plurality of site systems based on the application data store performance information, the required performance being performance of the data store required to implement the performance of the application identified from the target performance information,
- determine a data store allocated resource amount for the plurality of site systems based on the data store resource amount performance information, the data store allocated resource amount being a resource amount of hardware required to implement the required performance, and
- search for an arrangement plan of the application and the data store in the plurality of site systems capable of implementing the application allocated resource amount and the data store allocated resource amount.

* * * * *